United States Patent
Itoi et al.

(10) Patent No.: US 12,382,165 B2
(45) Date of Patent: Aug. 5, 2025

(54) IMAGE CAPTURING APPARATUS, CONTROL METHOD, AND STORAGE MEDIUM

(71) Applicant: CANON KABUSHIKI KAISHA, Tokyo (JP)

(72) Inventors: Yudai Itoi, Tokyo (JP); Yuki Tsujimoto, Tokyo (JP); Takuma Iwagami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 18/364,408

(22) Filed: Aug. 2, 2023

(65) Prior Publication Data
US 2024/0048865 A1    Feb. 8, 2024

(30) Foreign Application Priority Data
Aug. 5, 2022    (JP) ................ 2022-125849

(51) Int. Cl.
*H04N 23/65*    (2023.01)
*H04N 23/667*    (2023.01)

(52) U.S. Cl.
CPC ........... *H04N 23/65* (2023.01); *H04N 23/667* (2023.01)

(58) Field of Classification Search
CPC ........... H04N 1/00885; H04N 1/00904; H04N 23/65; H04N 23/651; H04N 23/667; H04N 25/709
See application file for complete search history.

(56) References Cited

U.S. PATENT DOCUMENTS

2006/0233564 A1* 10/2006 Yamamoto ......... H04N 1/32683
399/88

FOREIGN PATENT DOCUMENTS

JP    2009201542 A  *  9/2009
JP    2010166797 A     7/2010

OTHER PUBLICATIONS

Machine Translation of JP2009-201542 (Year: 2009).*

* cited by examiner

*Primary Examiner* — Daniel M Pasiewicz
(74) *Attorney, Agent, or Firm* — Canon U.S.A., Inc. IP Division

(57) ABSTRACT

An image capturing apparatus includes an image sensor, a power supply circuit, and a power storage device. A charging unit charges the power storage device using power from the power supply circuit. A control unit performs control such that in a first operation state of the image capturing apparatus, power is supplied from the power supply circuit to the image sensor without power being supplied from the power storage device to the image sensor. The control unit further performs control such that in a second operation state of the image capturing apparatus in which a maximum power consumption of the image sensor is higher than in the first operation state, power is supplied from the power supply circuit and the power storage device to the image sensor.

15 Claims, 16 Drawing Sheets

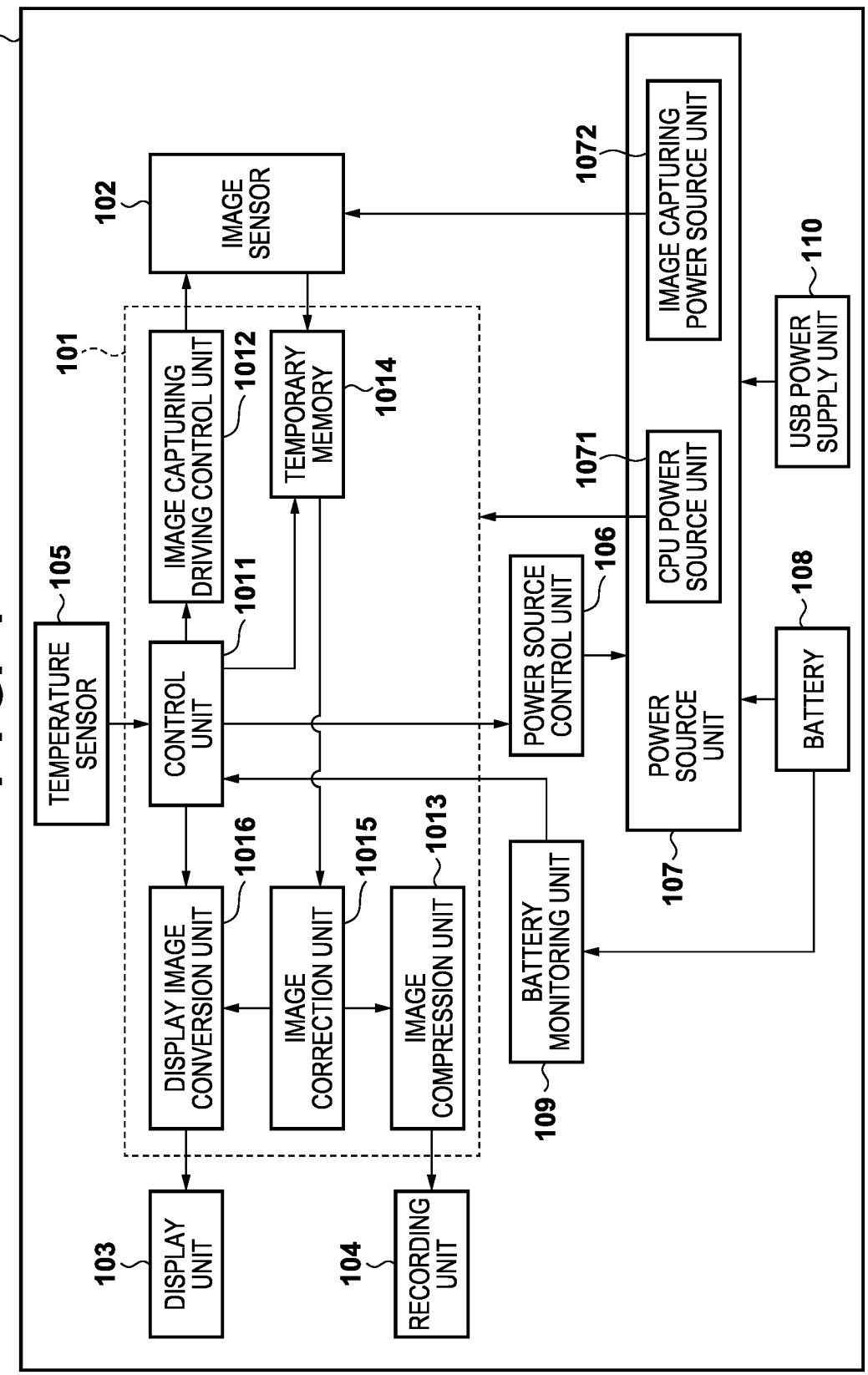

FIG. 6A

MAIN POWER SOURCE PATH (SETTING IN ACCORDANCE WITH TEMPERATURE)

| | TEMPERATURE OF POWER STORAGE DEVICE UNIT | | | | | | | | | | | |
|---|---|---|---|---|---|---|---|---|---|---|---|---|
| | GREATER THAN OR EQUAL TO 20°C | | | | GREATER THAN OR EQUAL TO 0°C BUT LESS THAN 20°C | | | | LESS THAN 0°C | | | |
| PATH SETTING | THROUGH | A | B | C | THROUGH | A | B | C | THROUGH | A | B | C |
| GLOBAL SHUTTER MODE (SHOOTING) | — | — | ○ | ○ | — | — | ○ | — | — | — | — | ○ |
| OTHER STILL IMAGE MODE (SHOOTING) | — | ○ | — | ○ | — | ○ | — | — | — | — | ○ | — |
| MOVING IMAGE MODE OR STILL IMAGE MODE (LV) | ○ | — | — | — | ○ | — | — | — | ○ | — | — | — |

(EXAMPLE)
THROUGH : 0Ω
A : 100mΩ
B : 200mΩ
C : 300mΩ

(NOTE)
LV : LIVE VIEW STATE

FIG. 6B

MAIN POWER SOURCE PATH (SETTING IN ACCORDANCE WITH ESR)

| | ESR OF POWER STORAGE DEVICE UNIT | | | | | | | | | | | | | | | |
|---|---|---|---|---|---|---|---|---|---|---|---|---|---|---|---|---|
| | LOW (LESS THAN 100mΩ) | | | | MEDIUM (GREATER THAN OR EQUAL TO 100mΩ BUT LESS THAN 400mΩ) | | | | LARGE (GREATER THAN OR EQUAL TO 400mΩ BUT LESS THAN 600mΩ) | | | | NG (GREATER THAN OR EQUAL TO 600mΩ) | | | |
| | PATH SETTING | | | | | | | | | | | | | | | |
| | THROUGH | A | B | C | THROUGH | A | B | C | THROUGH | A | B | C | THROUGH | A | B | C |
| GLOBAL SHUTTER MODE (SHOOTING) | — | — | — | ○ | — | — | — | ○ | — | — | — | ○ | PROHIBITED TO USE | | | |
| OTHER STILL IMAGE MODE (SHOOTING) | — | ○ | — | ○ | — | ○ | — | ○ | — | ○ | — | ○ | | | | |
| MOVING IMAGE MODE OR STILL IMAGE MODE (LV) | ○ | — | — | — | ○ | — | — | — | ○ | — | — | — | — | — | ○ | — |
| ESR MEASUREMENT MODE | — | ○ | — | — | — | ○ | — | — | — | ○ | — | — | — | — | ○ | — |

(EXAMPLE)
THROUGH : 0Ω
A : 100mΩ
B : 200mΩ
C : 300mΩ

(NOTE)
LV : LIVE VIEW STATE

FIG. 6C

CHARGING CONTROL

| | CHARGING VOLTAGE | | MAXIMUM CHARGING CURRENT |
| --- | --- | --- | --- |
| | TEMPERATURE≤ Ta | >Ta | |
| GLOBAL SHUTTER MODE (SHOOTING) | 5.0V | 5.0V | 100mA |
| GLOBAL SHUTTER MODE (LV) | 4.5V | 2.0V | 300mA |
| OTHER STILL IMAGE MODE (SHOOTING) | 4.5V | 4.5V | 100mA |
| OTHER STILL IMAGE MODE (LV) | 4.5V | 2.0V | 300mA |
| MOVING IMAGE MODE | 2.0V | | 100mA |
| ESR MEASUREMENT MODE | 4.5V | | 100mA |
| CAMERA OFF | 0.0V | | — |

(EXAMPLE)
THROUGH : 0Ω
　A:100mΩ
　B:200mΩ
　C:300mΩ

(NOTE)
LV : LIVE VIEW STATE

FIG. 8A  TEMPERATURE - ESR CHARACTERISTIC EXAMPLE
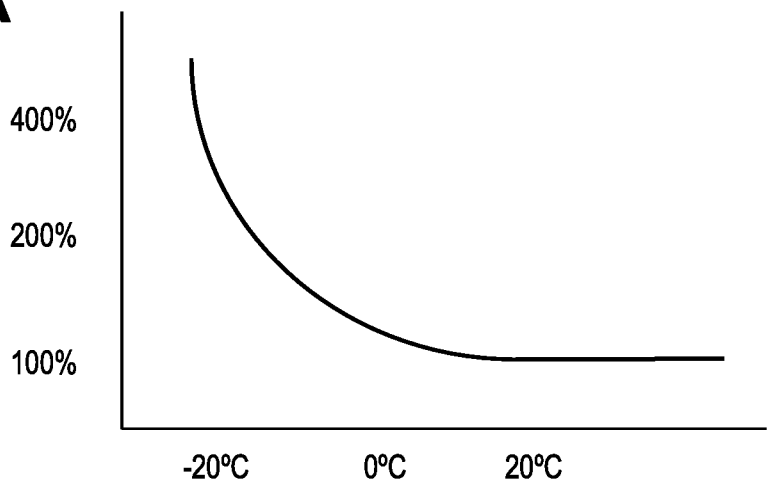
FIG. 8B  TIME (TEMPERATURE)-ESR CHARACTERISTIC EXAMPLE
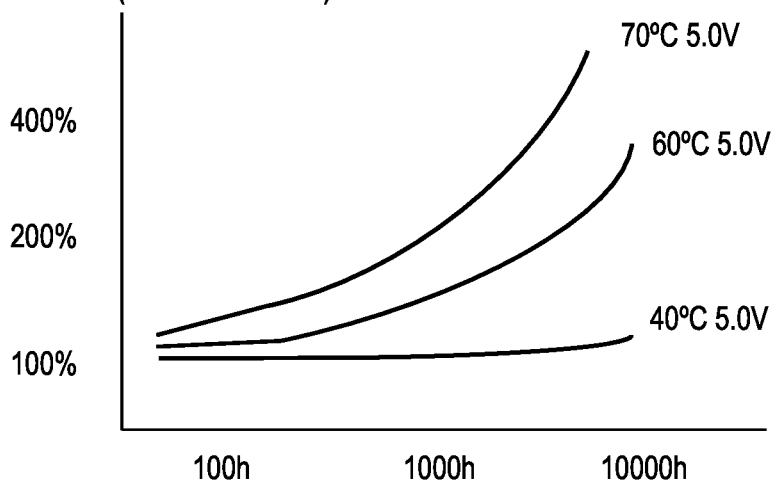
FIG. 8C  TIME (VOLTAGE)-ESR CHARACTERISTIC EXAMPLE
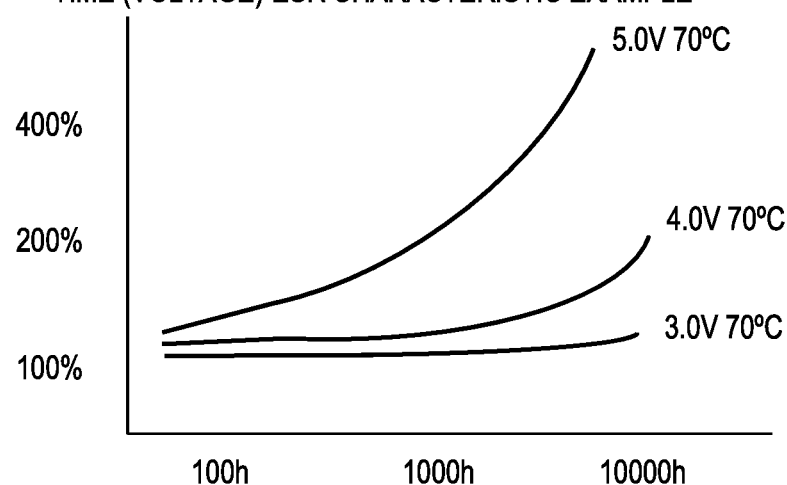

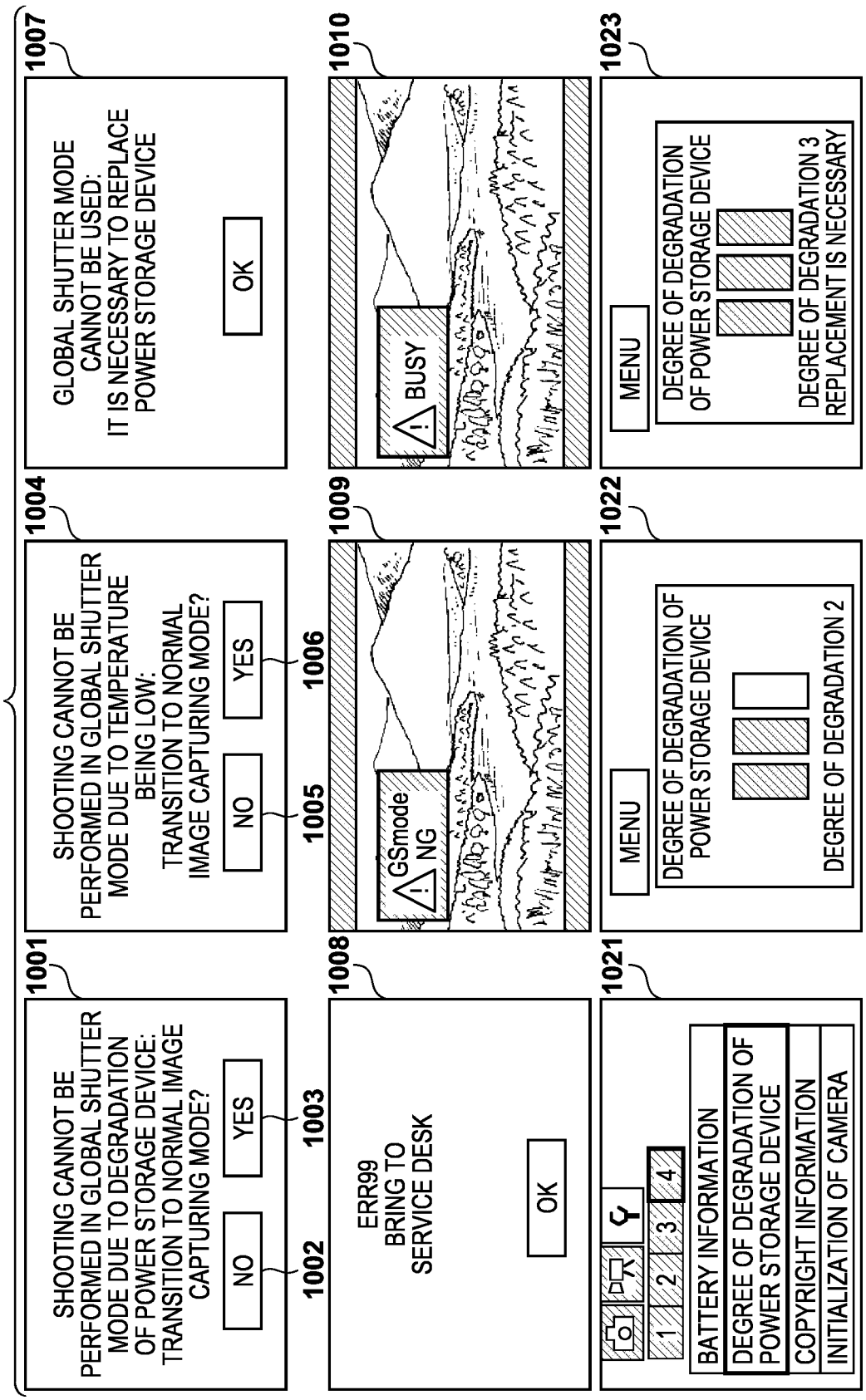

IMAGE CAPTURING APPARATUS, CONTROL METHOD, AND STORAGE MEDIUM

BACKGROUND

Technical Field

One aspect of the disclosed embodiments relates to an image capturing apparatus, a control method, and a storage medium.

Description of the Related Art

Techniques that assist in supplying power from a battery by using a capacitor to supply power to a load are known (e.g., Japanese Patent Laid-Open No. 2010-166797).

Additionally, an image capturing apparatus is known which includes an image sensor capable of reading out data from a plurality of pixels simultaneously, which makes it possible to shoot images while reducing rolling distortion without using a mechanical shutter.

When data of many pixels is read out from an image sensor simultaneously at high speed, the peak current of the image sensor increases. When the peak current increases, the current supplied from the battery of the image capturing apparatus may exceed a tolerance value, causing the voltage of the battery to drop and resulting in a system failure. Furthermore, when the peak current increases, a voltage drop may occur due to line resistance, and if the voltage drops below the minimum driving voltage of the image capturing apparatus, a system failure may occur. However, the technique of Japanese Patent Laid-Open No. 2010-166797 does not address such a problem in which the peak current of an image sensor exceeds a tolerance value.

SUMMARY

Having been achieved in light of such circumstances, the disclosure provides a technique for reducing the peak current of a main power supply that supplies power to an image sensor.

According to a first aspect of the embodiments, an image capturing apparatus includes an image sensor, a power supply circuit, a power storage device, and at least one processor which executes a program stored in a memory and functions as a charging unit and a control unit. The charging unit is configured to charge the power storage device using power from the power supply circuit. The control unit is configured to perform control such that in a first operation state of the image capturing apparatus, power is supplied from the power supply circuit to the image sensor without power being supplied from the power storage device to the image sensor. The control unit is also configured to perform control such that in a second operation state of the image capturing apparatus in which a maximum power consumption of the image sensor is higher than in the first operation state, power is supplied from the power supply circuit and the power storage device to the image sensor.

According to a second aspect of the embodiments, a control method is provided for an image capturing apparatus, which includes an image sensor, a power supply circuit, and a power storage device. The control method includes charging the power storage device using power from the power supply circuit; and performing control such that in a first operation state of the image capturing apparatus, power is supplied from the power supply circuit to the image sensor without power being supplied from the power storage device to the image sensor, and performing control such that in a second operation state of the image capturing apparatus in which a maximum power consumption of the image sensor is higher than in the first operation state, power is supplied from the power supply circuit and the power storage device to the image sensor.

According to a third aspect of the embodiments, a non-transitory computer-readable storage medium stores a program for causing a computer of an image capturing apparatus to execute a control method. The image capturing apparatus includes an image sensor, a power supply circuit, and a power storage device. The control method includes charging the power storage device using power from the power supply circuit; and performing control such that in a first operation state of the image capturing apparatus, power is supplied from the power supply circuit to the image sensor without power being supplied from the power storage device to the image sensor, and performing control such that in a second operation state of the image capturing apparatus in which a maximum power consumption of the image sensor is higher than in the first operation state, power is supplied from the power supply circuit and the power storage device to the image sensor.

Further features of the disclosure will become apparent from the following description of exemplary embodiments with reference to the attached drawings.

BRIEF DESCRIPTION OF THE DRAWINGS

FIG. 1 is a block diagram illustrating the configuration of an image capturing apparatus 100.

FIG. 6A is a diagram illustrating switch settings of a main power source path switching unit 401 when switching a main power source path in accordance with a temperature.

FIG. 6B is a diagram illustrating switch settings of the main power source path switching unit 401 when switching the main power source path in accordance with the ESR of a power storage device unit 202.

FIG. 6C is a diagram illustrating settings of a power storage device charging/discharging unit 204 in respective operation modes.

FIGS. 7-1 and 7-2 are timing charts for explaining an example of operations of the image capturing apparatus 100.

FIG. 8A is a diagram illustrating temperature characteristics of the power storage device unit 202.

FIGS. 8B and 8C are diagrams illustrating degradation characteristics of the power storage device unit 202.

FIG. 10 is a diagram illustrating examples of various types of notifications made to a user by the image capturing apparatus 100.

DESCRIPTION OF THE EMBODIMENTS

Figure 2:
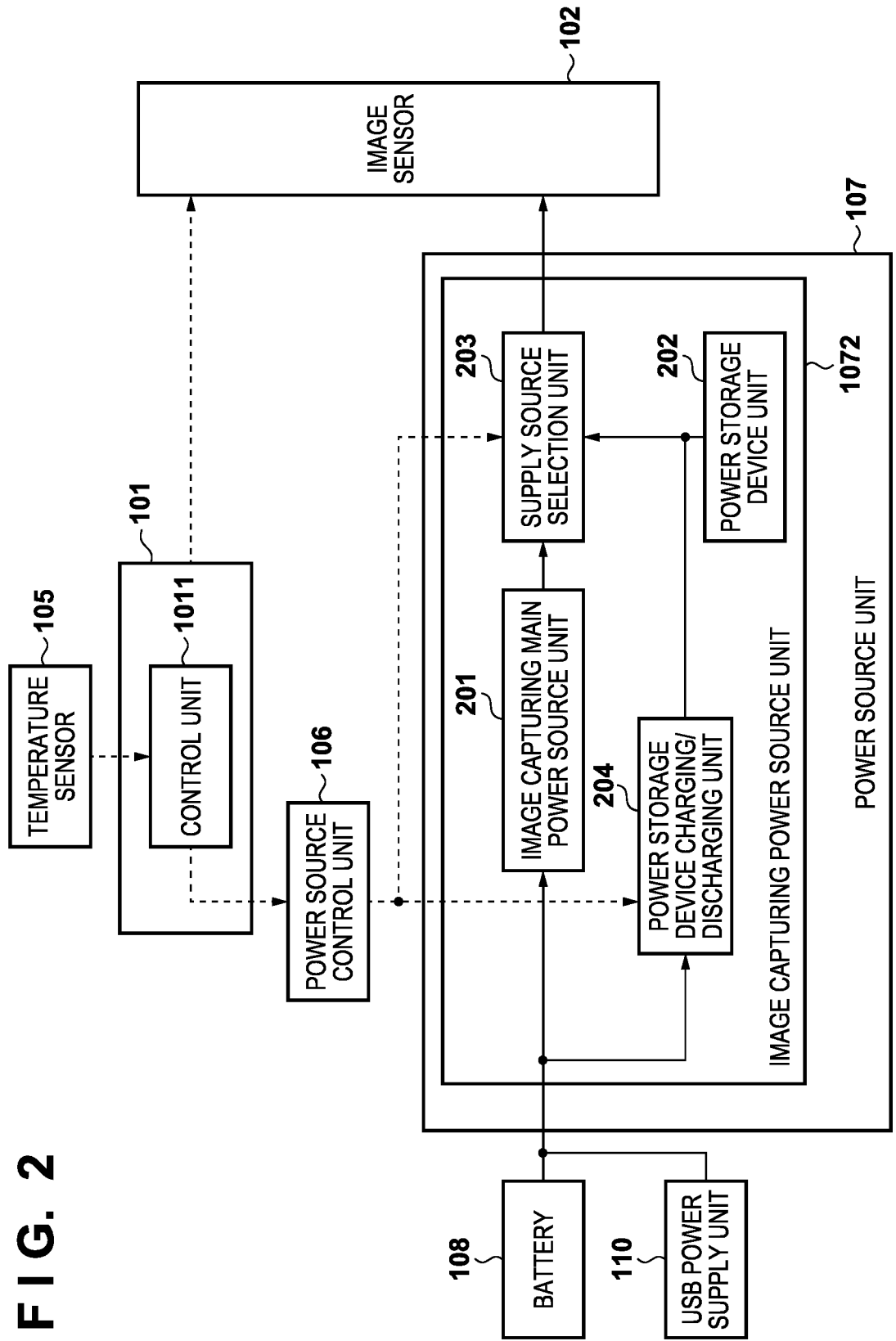
FIG. 2 is a block diagram illustrating, in detail, the configuration of an image capturing power source unit 1072.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted. In the following, the term "unit" may have different meanings depending on the context. The usual meaning is an individual element, single and complete. The phrase "units of" may refer to a plurality of elements or a group of elements. In addition, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices.

First Embodiment

Figures 1, 7:
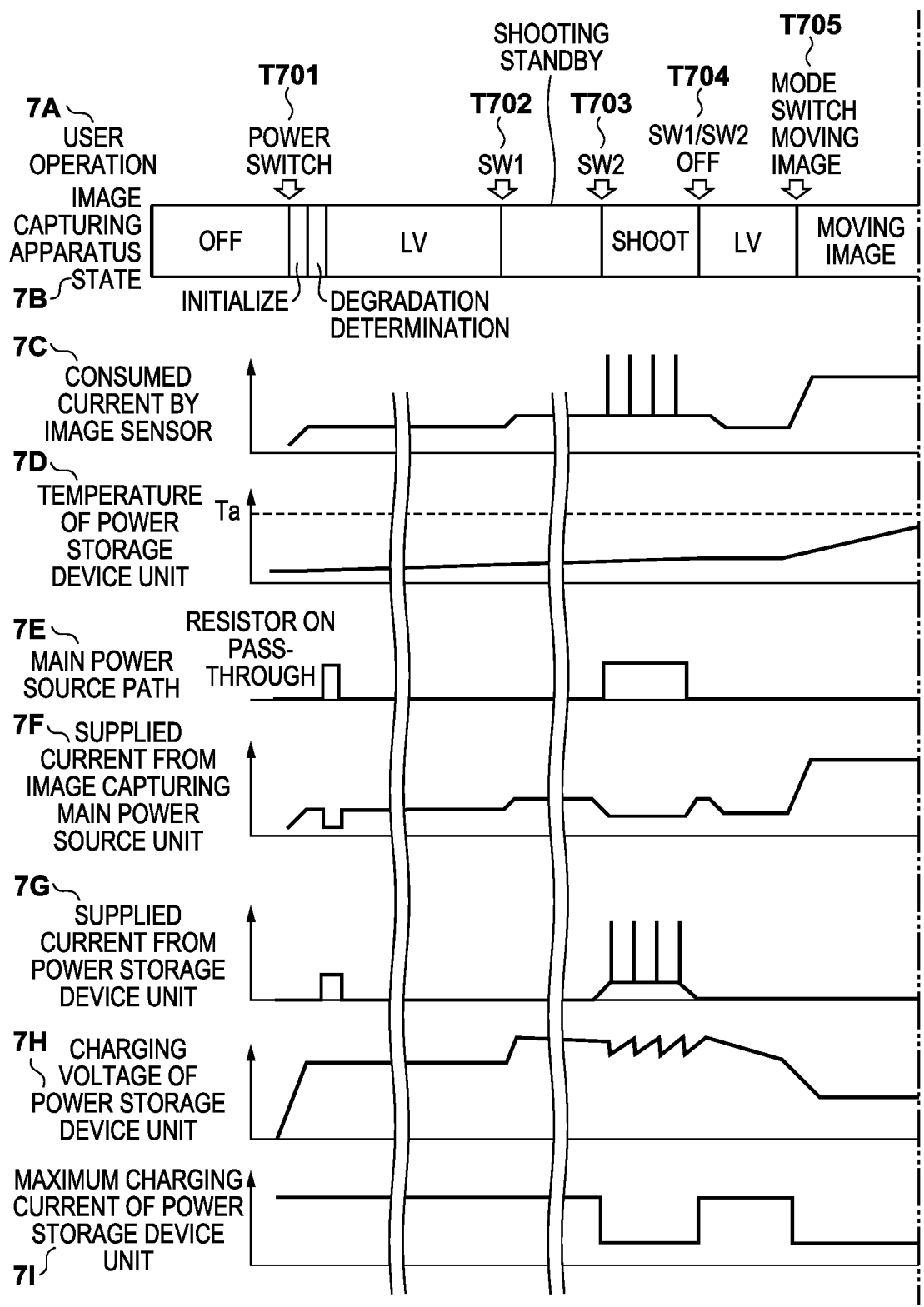
Figures 2, 7:
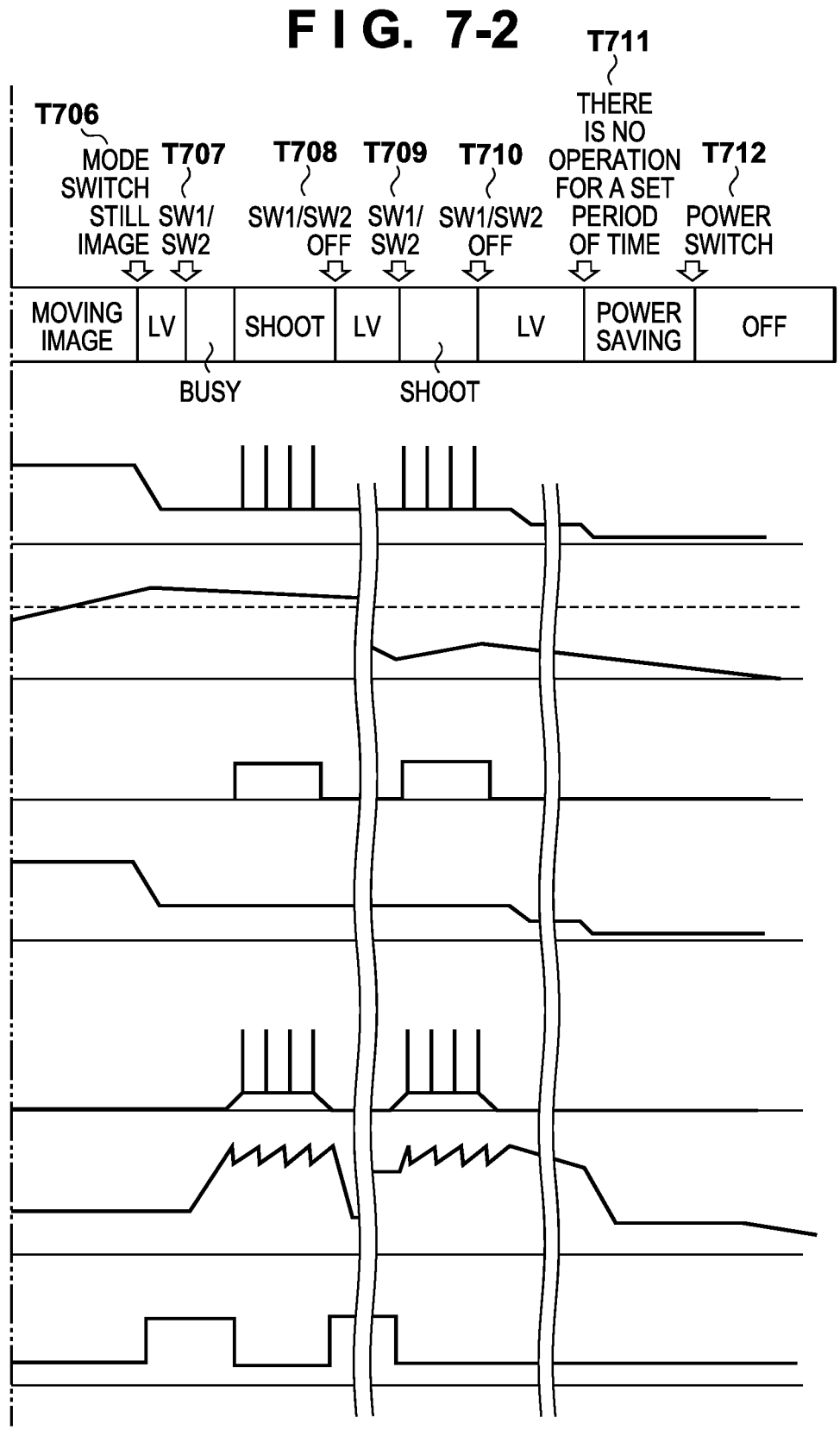

FIG. 1 is a block diagram illustrating the configuration of an image capturing apparatus 100. The configuration and operations of the image capturing apparatus 100 will be described with reference to FIG. 1. An image capturing driving control unit 1012, which receives commands from a control unit 1011 within a CPU 101 that controls the image capturing apparatus 100 as a whole, controls an image sensor 102 based on those commands. The image sensor 102 controlled in this manner performs photoelectric conversion (exposure) by capturing light from a subject into each of pixels, and generates digital data using an A/D converter within the image sensor 102. Image data generated based on the digital data obtained from the pixels is loaded into a temporary memory 1014 within the CPU 101. The image sensor 102 includes a number of pixels corresponding to a resolution of at least 8K (7,680 horizontal pixels×4,320 vertical pixels). The image sensor 102 can output 8K image data at 60 frames per second.

When a through-the-lens image is to be displayed in a shooting standby state, data is captured from the image sensor 102 in response to a thinning driving command for through-the-lens images, issued from the control unit 1011. The captured data is stored in the temporary memory 1014. The image obtained from the image sensor 102 and stored in the temporary memory 1014 is corrected by an image correction unit 1015, converted into display data by a display image conversion unit 1016, and displayed in a display unit 103.

An instruction to capture an image is made by a user pressing a release button (not shown). When an instruction to capture an image is made, the control unit 1011 instructs the image capturing driving control unit 1012 to execute the driving control for actual shooting (shooting a recording image). The image capturing driving control unit 1012 controls the driving of the image sensor 102 in response to the instruction from the control unit 1011, and captures the image data from the image sensor 102. The image data captured from the image sensor 102 and stored in the temporary memory 1014 is corrected by the image correction unit 1015, subjected to JPEG encoding processing by an image compression unit 1013, and recorded as a still image in a recording unit 104.

An instruction for recording a moving image is made by the user pressing a moving image recording button (not shown). When the user has made an instruction to record a moving image, the control unit 1011 instructs the image capturing driving control unit 1012 to execute driving control for moving images. The image capturing driving control unit 1012 controls the driving of the image sensor 102 in response to the instruction from the control unit 1011, and continuously captures image data from the image sensor 102. The image data captured from the image sensor 102 and stored in the temporary memory 1014 is corrected by the image correction unit 1015, subjected to moving image encoding processing by the image compression unit 1013, and recorded as a moving image in the recording unit 104. Although not illustrated in FIG. 1 for the sake of simplicity, the image capturing apparatus 100 also includes an operation unit for inputting user operations and the like.

Operation modes of the image capturing apparatus 100 typically include a still image mode and a moving image mode. More specifically, the still image mode itself includes a single shot mode in which a single still image is shot each time the release button is pressed, and a continuous shooting mode in which still images are obtained continuously while the release button is being pressed. The continuous shooting mode also includes a high-speed continuous shooting mode in which a higher number of shots are taken per unit of time, and a low-speed continuous shooting mode in which a relatively low number of shots are taken per unit of time.

In addition to the single shot mode and the continuous shooting mode, which are modes pertaining to the number of shots taken, there are also modes pertaining to the readout method of the image sensor 102. The image sensor 102 is a CMOS type image sensor and has a plurality of read out modes including a high-speed readout mode and a low-speed readout mode. In particular, the high-speed readout mode includes a global shutter mode that reads out all the pixels at once. The modes pertaining to the readout method include the high-speed readout mode, the low-speed readout mode and the global shutter mode. In the high-speed readout mode, a greater number of pixels of the image sensor 102 are read out simultaneously. A still image in which distortion of a subject which is moving is suppressed is obtained using the high-speed readout mode. In the low-speed readout mode, the number of pixels read out simultaneously is reduced.

In the moving image mode, the image capturing apparatus 100 has a plurality of operation modes based on the format of the moving image to be recorded. For example, the moving image mode includes an 8K recording mode, a 4K recording mode, a full HD (FHD) recording mode, and the like. The framerate can also be changed during the moving image mode, and the image capturing apparatus 100 has a plurality of operation modes pertaining to the framerate.

The stated operation modes of the image capturing apparatus 100 may be changed in response to a user operation, or the control unit 1011 may automatically change to an operation mode that is optimal for the user.

A power source unit 107 is responsible for converting power supplied from a battery 108 or a Universal Serial Bus (USB) power supply unit 110 to a required voltage/current and supplying the power to the various units of the image capturing apparatus 100. The battery 108 corresponds to a power source of the image capturing apparatus 100, and is a removable lithium-ion battery, for example. A battery monitoring unit 109 monitors the voltage, discharge current, and the like of the battery 108, and transmits information to the control unit 1011. The battery monitoring unit 109 can also calculate the internal resistance of the battery 108 from the discharge current and a voltage drop amount of the battery 108. Based on battery information provided by the battery monitoring unit 109, the control unit 1011 performs control such as, for example, setting the image capturing apparatus 100 to a power-saving state when the remaining power in the battery 108 is low, when the internal resistance is rising, or the like.

The image capturing apparatus 100 can also operate using power supplied from the USB power supply unit 110 instead of the battery 108. The USB power supply unit 110 is connected to a mobile battery, an AC adapter, or the like by a USB cable. In FIG. 1, only a Central Processing Unit (CPU) power source unit 1071 that supplies power to the CPU 101 and an image capturing power source unit 1072 that supplies power to the image sensor 102 are indicated in the power source unit 107. However, the power source unit 107 also includes a power source unit that supplies power to the display unit 103, the recording unit 104, and the like.

A power source control unit 106 controls the power source unit 107 based on commands from the control unit 1011. For example, the power source control unit 106 controls the various units within the power source unit 107 to turn on and off, changes output voltages, and the like. Although FIG. 1 illustrates the power source control unit 106 as a separate device from the CPU 101, the power source control unit 106 may instead be configured within the CPU 101. Alternatively, a configuration may be employed in which the control unit 1011 directly controls the power source unit 107.

A temperature sensor 105 is disposed within the image capturing apparatus 100, detects a temperature near the temperature sensor 105, and outputs temperature data. The control unit 1011 can estimate the temperature at a given location in the image capturing apparatus 100 based on the data output from the temperature sensor 105. The temperature sensor 105 is not limited to a single sensor, and the control unit 1011 can estimate the temperature of the image capturing apparatus 100 in more detail based on data output from two or more temperature sensors 105. The control unit 1011 can change the control of the image capturing apparatus 100 in accordance with temperature information. For example, the control unit 1011 sends a command to the image capturing driving control unit 1012 to stop image capturing operations when the estimated temperature of the image sensor 102 exceeds a predetermined temperature. At the same time, the control unit 1011 sends a command to the power source control unit 106 to turn the image capturing power source unit 1072 off. Through this, the image capturing operations can be stopped safely when the image sensor 102 has entered a temperature state which is outside a usable range.

FIG. 2 is a block diagram illustrating, in detail, the configuration of the image capturing power source unit 1072. Power from the battery 108 or the USB power supply unit 110 is input to an image capturing main power source unit 201 and a power storage device charging/discharging unit 204. The image capturing main power source unit 201 converts the voltage of the battery 108 into an operating voltage for the image sensor 102 and outputs the voltage. The image capturing main power source unit 201 includes, for example, a DC/DC converter, an LDO, or the like. The power storage device charging/discharging unit 204 performs operations for charging a power storage device unit 202 using power from the battery 108 or the USB power supply unit 110.

The power storage device unit 202 is, for example, an electrical double-layer capacitor (EDLC), but is not limited thereto. Any power storage device, such as an all-solid-state battery, may be used as the power storage device unit 202 as long as the capacity is high enough to supply driving power for the image sensor 102 and there is equivalent series resistance (ESR) capable of supporting the reaction speed of the image sensor 102.

A supply source selection unit 203 supplies power to the image sensor 102 by selecting one or both of outputs from the image capturing main power source unit 201 and the power storage device unit 202. The supply source selection unit 203 is controlled by the power source control unit 106 to supply power from the battery 108 or the USB power supply unit 110 to the image sensor 102, primarily via the image capturing main power source unit 201. However, the power from the battery 108 or the USB power supply unit 110 is also used as power for other circuit blocks of the image capturing apparatus 100. Accordingly, if an attempt is made to use the power from the battery 108 or the USB power supply unit 110 to handle all the power consumed by the image sensor 102, there is a risk that the power consumed by the image capturing apparatus 100 will exceed the allowable power of the battery 108 or the USB power supply unit 110. For example, when the operation mode of the image capturing apparatus 100 is the global shutter mode, the image sensor 102 consumes large amounts of power instantaneously in order to read out all the pixels simultaneously. There is thus a high risk that the current consumed by the image capturing apparatus 100 will exceed the allowable output current of the battery 108 or the USB power supply unit 110. Accordingly, in operation modes of the image capturing apparatus 100 where the maximum power is high, such as the global shutter mode, the supply source selection unit 203 is controlled to supply power from the power storage device unit 202 to the image sensor 102.

Aside from the global shutter mode, modes that read out a plurality of pixels simultaneously, modes that increase the readout speed for the purpose of high-speed continuous shooting, and the like are also included in the operation modes of the image capturing apparatus 100 where the maximum power is high.

When power once stored in the power storage device unit 202 is consumed by the image sensor 102, the current supplied from the battery 108 or the USB power supply unit 110 is reduced. If the power storage device unit 202 is capable of supplying a sufficient level of power, the supply source selection unit 203 may select only the power from the power storage device unit 202 and supply that power to the image sensor 102.

When the power storage device charging/discharging unit 204 charges the power storage device unit 202 with a constant current, the output current from the power storage device charging/discharging unit 204 is constant as well. With respect to the output voltage, the power storage device charging/discharging unit 204 changes the voltage in accordance with a rise in the voltage of the power storage device unit 202. When the voltage of the power storage device unit 202 reaches a charge-complete voltage, the power storage device charging/discharging unit 204 stops the charging operations.

The output voltage, the output current, and the charge-complete voltage of the power storage device charging/discharging unit 204 can be changed under the control of the power source control unit 106. For example, setting the output current of the power storage device charging/discharging unit 204 to a high value makes it possible to reduce the time required to fully charge the power storage device unit 202. On the other hand, if the output current is set to a high value, the power taken from the battery 108 or the USB power supply unit 110 will increase. Accordingly, the output current value of the power storage device charging/discharging unit 204 can also be set to a low value to suppress the power taken from the battery 108 or the USB power supply unit 110. Setting the charge-complete voltage of the power storage device charging/discharging unit 204 to a higher value makes it possible to supply more power from the power storage device unit 202 to the image sensor 102. On the other hand, if the charge-complete voltage is set to a high value, there is a risk of the power storage device unit 202 degrading more quickly due to a high voltage being applied to the power storage device unit 202 for a long period of time. As such, the charge-complete voltage of the power storage device charging/discharging unit 204 can also be set to a low value to prevent degradation. Although the foregoing describes a case where the power storage device charging/discharging unit 204 charges the power storage device unit 202 with a constant current, it should be noted that constant voltage charging may be used, and in this case, upper limit values can be set for the charging voltage and the charging current by the power source control unit 106.

In addition to the charging function of the power storage device unit 202, the power storage device charging/discharging unit 204 also includes a discharging function for avoiding overcharging the power storage device unit 202.

The hardware structure of the image capturing apparatus 100 will be described next with reference to FIG. 3. A main circuit board 301 and an image sensor circuit board 302 are disposed within a housing of the image capturing apparatus 100. The CPU 101, the power source unit 107, and the like are mounted on the main circuit board 301. The image sensor 102 is mounted on the image sensor circuit board 302. The image sensor circuit board 302 is disposed closer to a lens than the main circuit board 301 such that the image sensor 102 can capture light efficiently.

The image sensor circuit board 302 is connected to the main circuit board 301 by flexible printed circuits (FPCs), connectors, or the like. As a result, control signals from the CPU 101, power from the image capturing power source unit 1072, and the like can be supplied to the image sensor 102. The power storage device unit 202 may be mounted on the main circuit board 301, or may be mounted on the image sensor circuit board 302. When the power storage device unit 202 is mounted on the image sensor circuit board 302, the impedance between the image sensor 102 and the power storage device unit 202 decreases, and thus there is the advantage that the power from the power storage device unit 202 is supplied to the image sensor 102 with ease.

Figure 3:
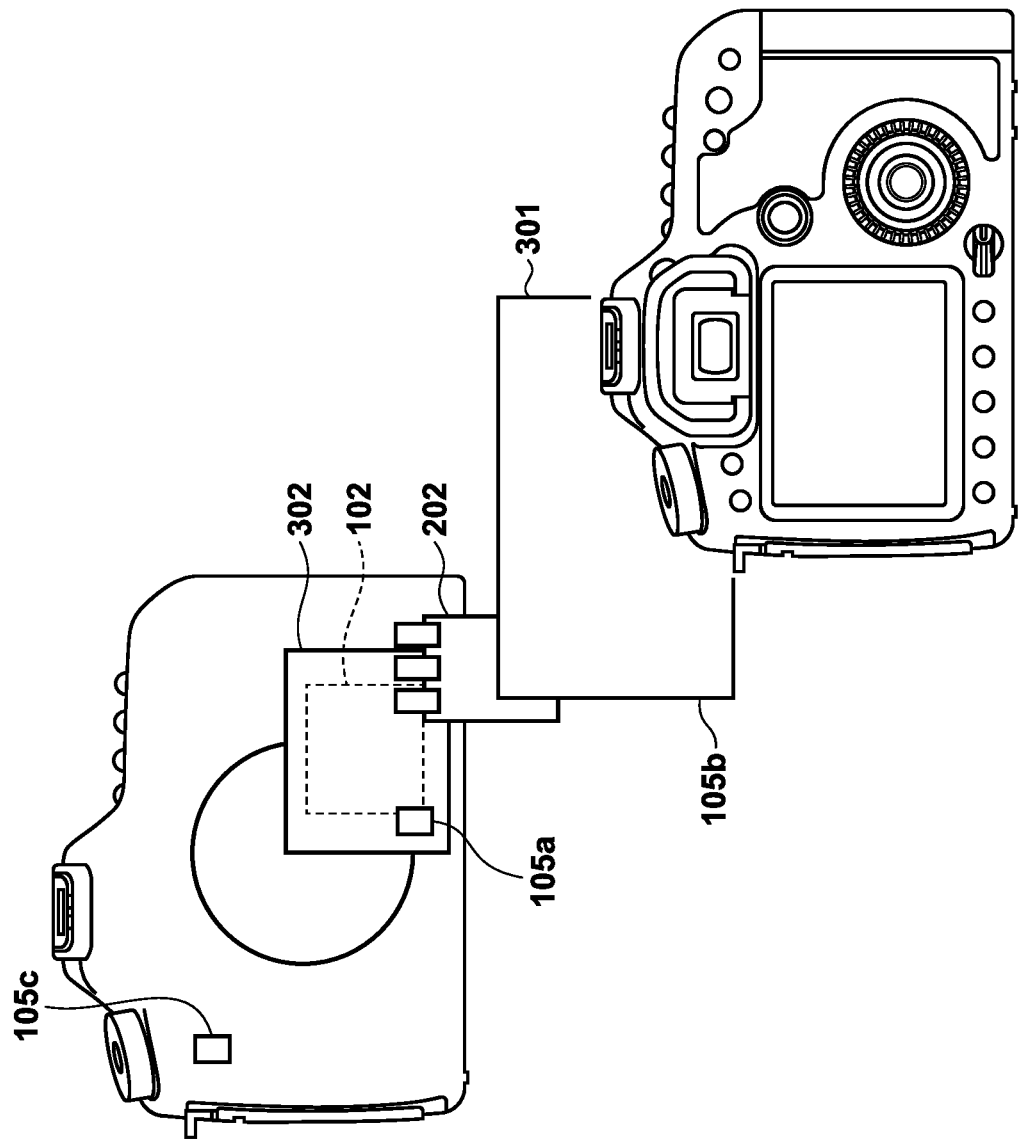
FIG. 3 is a diagram illustrating the hardware structure of the image capturing apparatus 100.

FIG. 3 illustrates a temperature sensor 105a, a temperature sensor 105b, and a temperature sensor 105c as examples of a plurality of temperature sensors 105. The temperature sensor 105a is a temperature sensor disposed on the image sensor circuit board 302. The temperature sensor 105b is a temperature sensor disposed on the main circuit board 301. The temperature sensor 105c is a temperature sensor attached to the housing. The control unit 1011 can estimate the temperature at a given location in the image capturing apparatus 100 based on the data output from these temperature sensors 105.

The power storage device unit 202 degrades more quickly when exposed to a high-temperature environment, and it is therefore important to manage the temperature of the power storage device unit 202. For example, when the power storage device unit 202 is mounted on the image sensor circuit board 302, the temperature sensor 105a is used not only to monitor whether the image sensor 102 is at a temperature outside the usable range, but also to estimate the temperature of the power storage device unit 202. When the power storage device unit 202 is mounted on the main circuit board 301, the temperature sensor 105b disposed near the power storage device unit 202 is used to estimate the temperature of the power storage device unit 202. If the temperature sensor 105b cannot be disposed near the power storage device unit 202, the control unit 1011 estimates the temperature of the power storage device unit 202 on the main circuit board 301 using the data output from the temperature sensor 105b based on the correlation between the output of the temperature sensor 105b and the power storage device unit 202.

Figure 4A:
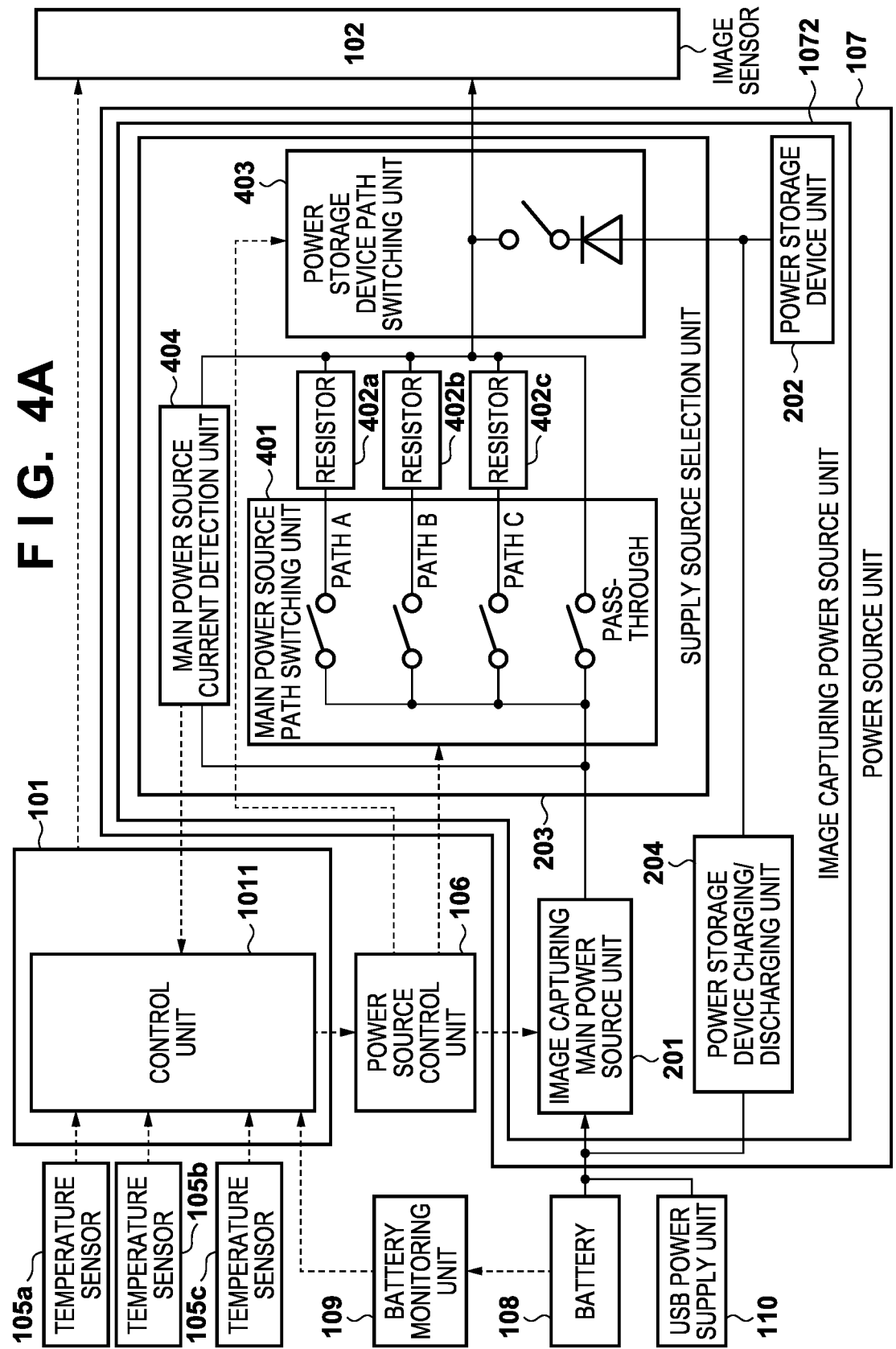
FIG. 4A is a block diagram illustrating, in detail, the configuration of a supply source selection unit 203.

FIG. 4A is a block diagram illustrating, in detail, the configuration of the supply source selection unit 203. In the example illustrated in FIG. 4A, the supply source selection unit 203 is configured such that the impedance of a power supply path from the image capturing main power source unit 201 to the image sensor 102 (a main power source path) can be switched.

The supply source selection unit 203 includes a main power source path switching unit 401, resistors 402, a power storage device path switching unit 403, and a main power source current detection unit 404. "Resistors 402" is a collective term for resistors 402a to 402c illustrated in FIG. 4A. The main power source path switching unit 401 and the power storage device path switching unit 403 can switch a switch on and off under the control of the power source control unit 106.

During shooting operations in an operation mode where the maximum power consumption of the image capturing apparatus 100 is relatively high (e.g., the global shutter mode), the power storage device path switching unit 403 turns the power supply path from the power storage device unit 202 to the image sensor 102 (a power storage device path) on. Charging the power storage device unit 202 at a higher voltage than the voltage of the image capturing main power source unit 201 in advance, prior to the shooting operations, makes it possible to supply power from the power storage device unit 202 to the image sensor 102 preferentially during the shooting operations.

However, the voltage of the power storage device unit 202 drops as power is supplied from the power storage device unit 202 to the image sensor 102. In addition, the voltage of the power storage device unit 202 drops in proportion to the amount of current taken from the power storage device unit 202 through the equivalent series resistance (ESR) of the power storage device unit 202. In the example illustrated in FIG. 4A, a diode is disposed in a circuit constituting the power storage device path switching unit 403 such that current does not flow from the image capturing main power source unit 201 to the power storage device unit when the power storage device path is turned on. The voltage on the power storage device path side drops due to this diode as well. When the voltage on the power storage device path side drops, the voltage of the main power source path and the voltage of the power storage device path reach the same potential at the junction point of the paths. In this state, power is supplied to the image sensor 102 preferentially from the path having the lower impedance.

When the main power source path switching unit 401 is in a pass-through state, and the line impedance of the main power source path from the image capturing main power source unit 201 is sufficiently low, power is supplied from the image capturing main power source unit 201 to the image sensor 102 preferentially, even if the power storage device path is on. Accordingly, power is not supplied from the power storage device unit 202 to the image sensor 102. To avoid such a state, the main power source path switching unit 401 switches the switch so as to limit the current on the main power source path side. Specifically, the main power source path switching unit 401 performs switching operations for the switches such that the resistors 402 are arranged in series in the main power source path, such that the impedance of the main power source path becomes greater than the impedance of the power storage device path including the ESR of the power storage device unit 202. This makes it possible to continuously supply power from the power storage device unit 202 to the image sensor 102 preferentially even if the voltage of the power storage device unit 202 drops.

Note that if the power storage device path is turned on in a state where the voltage in the power storage device unit 202 is higher than the voltage in the image capturing main power source unit 201, there is a risk of reverse current flowing back to the output of the image capturing main power source unit 201. To prevent this reverse current, a reverse current prevention function may be provided in the image capturing main power source unit 201 or a switch disposed in series in the main power source path.

The supply source selection unit 203 includes the resistors 402a to 402c, which have different resistance values, as the resistors 402. The resistor 402b has a higher resistance value than the resistor 402a, and the resistor 402c has a higher resistance value than the resistor 402b. The supply source selection unit 203 selects the optimal resistor 402 according to the circumstances. Although FIG. 4A illustrates four paths having different impedances, the number of paths is not limited to four. Additionally, the combined impedance of a path may be changed by changing the combination of switches to be turned on.

Even when the power supply from the power storage device unit 202 is to be prioritized, it is desirable for the resistance values of the resistors 402 to be as low as possible to reduce unnecessary loss caused by the resistors 402. Accordingly, at the initial stage of operations by the image capturing apparatus 100, the supply source selection unit 203 turns on a path A, which has a relatively low resistance value. However, the impedance of the main power source path decreases relative to an increase in the impedance of the power storage device path, and as a result, the necessary power is not supplied to the power storage device unit 202. A case where the power storage device unit 202 is at a low temperature can be given as an example in which the impedance of the power storage device path increases. The ESR tends to increase when the power storage device unit 202 is in a low-temperature state. To address this problem, the control unit 1011 changes the impedance of the main power source path by controlling the main power source path switching unit 401 via the power source control unit 106, based on the data output from the temperature sensors 105. Specifically, the control unit 1011 estimates the temperature of the power storage device unit 202 based on the output from the temperature sensors 105. The control unit 1011 then performs control for switching from the path A to a path B or a path C in accordance with a predicted impedance of the power storage device path at the estimated temperature. As a result, even if the impedance of the power storage device path has increased due to a low temperature, the necessary power is supplied from the power storage device unit 202.

For example, a state in which the path A is selected will be called a "first supply mode". A state in which the path B or the path C is selected can be called a "second supply mode". In the second supply mode, the value of the current output from the main power source path is controlled to be lower than in the first supply mode. Although FIG. 4A illustrates a configuration in which three paths (paths A to C), aside from a pass-through path, can be switched, the number of paths is not particularly limited.

The increase in the impedance of the power storage device path is caused not only by the temperature characteristics of the power storage device unit 202, but also by degradation of the power storage device unit 202. When the power storage device unit 202 degrades, the ESR increases. In this manner, the ESR is variable, and thus the control unit 1011 measures the impedance of the power storage device path. The impedance of the power storage device path can be measured through a calculation for detecting the current in the main power source path. To that end, the supply source selection unit 203 includes the main power source current detection unit 404.

The main power source current detection unit 404 can calculate current flowing in the main power source path from the voltage difference across both ends of the resistors 402. For example, if it is known that the current when reading out the image sensor is 3 A and the current flowing in the main power source path is 1 A, 2 A of current is flowing in the power storage device path. A ratio between the current flowing in the power storage device path and the current flowing in the main power source path corresponds to a ratio between the impedance of the main power source path and the impedance of the power storage device path. Assuming that the main power source path at this time is the path A, the control unit 1011 can calculate the impedance of the power storage device path as ½ the resistance of the resistor 402a. The control unit 1011 performs control for switching from the path A to the path B or the path C via the power source control unit 106 in accordance with the impedance of the power storage device path calculated in this manner. As a result, the necessary power is supplied from the power storage device unit 202 to the image sensor 102 even if the power storage device unit 202 degrades and the impedance of the power storage device path increases.

A configuration may be employed in which the impedance of the power storage device path is measured by a method other than detecting the current in the main power source path. For example, a configuration in which a switch in the power storage device path switching unit 403 calculates the impedance of the power storage device path may be provided. The impedance of the power storage device path can be measured from the current and voltage flowing in the power storage device path. In another example, a configuration in which the impedance of the power storage device path is calculated in the power storage device charging/discharging unit 204 may be provided. The impedance of the power storage device path can be measured from a voltage drop amount or the like of the power storage device unit 202 when discharging at a constant current.

There is a disadvantage in that if the impedance of the main power source path is increased, loss in the main power source path increases as well. Furthermore, when the power storage device path is on, power is supplied from the power storage device unit 202 to the image sensor 102 regardless of whether it is necessary to supply power from the power storage device unit 202 to the image sensor 102. As a result, the power storage device unit 202 is charged and discharged needlessly, which in turn results in the battery 108 holding a charge poorly.

To solve this problem, when the operation mode of the image capture apparatus is an operation mode where the maximum power consumption of the image capturing apparatus 100 is relatively low and the image capturing apparatus 100 operates within the allowable power of the battery 108 or the USB power supply unit 110, the main power source path switching unit 401 switches the path such that the impedance of the main power source path decreases. This makes it possible to minimize loss in the main power source path. Additionally, when the voltage of the main power source path and the voltage of the power storage device path reach the same potential due to the impedance of the main power source path being low, power is supplied from the image capturing main power source unit 201 to the image sensor 102. This reduces the needless charging/discharging of the power storage device unit 202, which can improve how well the battery 108 holds a charge. In addition, the power storage device path switching unit 403 may turn the power storage device path off at the same time as when the main power source path is switched. This makes it possible to cause the image sensor 102 to operate without consuming the power with which the power storage device unit 202 has been charged, which makes it possible to prevent loss caused by the needless charging/discharging of the power storage device unit 202.

The operation modes in which the image capturing apparatus 100 operates within the allowable power of the battery 108 or the USB power supply unit 110 described above are, for example, the moving image mode, the single shot mode and the low-speed continuous shooting mode in the still image mode, and the low-speed readout mode. A live view state during an operation mode where the maximum power consumption of the image capturing apparatus 100 is relatively high (e.g., the global shutter mode, the high-speed continuous shooting mode, the high-speed readout mode, and the like) is also included in the operation modes in which the image capturing apparatus 100 operates within the allowable power of the battery 108 or the USB power supply unit 110.

The main power source path switching unit 401 is not limited to perform the control to switch the main power source path in accordance with the operation modes of the image capturing apparatus 100, and may control the main power source path to be switched between periods where readout operations of the image sensor 102 are performed and other periods. For example, the main power source path switching unit 401 performs control such that the impedance of the main power source path increases in synchronization with the readout operations of the image sensor 102, and the impedance of the main power source path decreases in other periods than the readout. Performing such control makes it possible to reduce current taken out from the battery 108 or the USB power supply unit 110 during readout operations, and reduce unnecessary loss in the power storage device unit 202 in other periods than the readout.

Figure 4B:
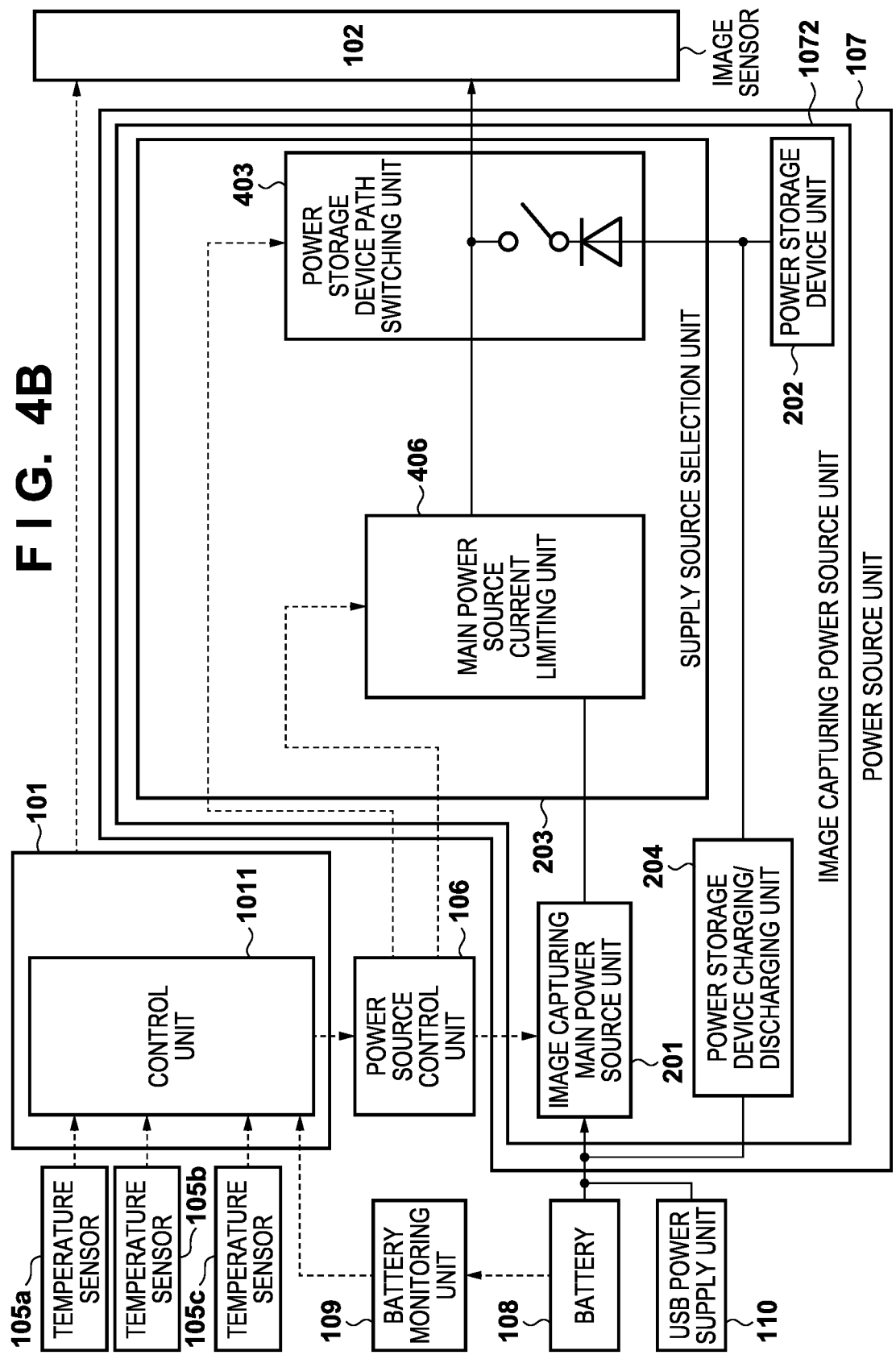
FIG. 4B is a diagram illustrating another example of the configuration of the supply source selection unit 203.

FIG. 4B is a diagram illustrating another example of the configuration of the supply source selection unit 203. Compared to FIG. 4A, in FIG. 4B, the main power source path switching unit 401 has been replaced with a main power source current limiting unit 406. The main power source current limiting unit 406 performs current limiting, which is processing in which the current value output to the image sensor 102 from the main power source path is limited so as not to exceed a current threshold set by the power source control unit 106. Although FIG. 4B illustrates a case where the main power source current limiting unit 406 is a constituent element of the supply source selection unit 203 as an example, the image capturing main power source unit 201 may instead be provided with functionality equivalent to that of the main power source current limiting unit 406.

Like the main power source path switching unit 401 illustrated in FIG. 4A, the main power source current limiting unit 406 can change the current threshold based on information from the temperature sensor 105. Also, like the main power source path switching unit 401 illustrated in FIG. 4A, the main power source current limiting unit 406 can also change the current threshold in accordance with the operation mode of the image capturing apparatus 100.

The main power source current limiting unit 406 also has a first supply mode and a second supply mode such as those described above. In the second supply mode, the current value output from the main power source path is controlled to be lower than in the first supply mode. In this case, the control unit 1011 can control the switching between the first supply mode and the second supply mode in accordance with the operation mode of the image capturing apparatus 100. Additionally, the control unit 1011 can control the switching between the first supply mode and the second supply mode in accordance with information from the temperature sensors 105. Furthermore, the control unit 1011 can control the switching between the first supply mode and the second supply mode in accordance with the ESR. Such switching control makes it possible to suppress power loss in the image capturing power source unit 1072 while reducing the maximum current (peak current) of the battery 108 or the USB power supply unit 110.

Note that a state where the current in the main power source path is not limited may be the first supply mode, and a state where the current is limited may be the second supply mode. Additionally, a configuration may be employed in which supply modes are switched among three or more supply modes having different degrees of current limitation. Here, the degree of the current limitation can also be called the magnitude of the value of the current output to the image sensor 102 from the main power source path. Control is performed such that the greater the current limitation is, the value of the current output to the image sensor 102 from the main power source path decreases.

Additionally, a configuration may be employed in which the supply mode is switched in accordance with the state of the battery 108 monitored by the battery monitoring unit 109 illustrated in FIG. 4B. For example, when the voltage of the battery 108 is lower than a predetermined voltage value, the control unit 1011 switches to the second supply mode. In another example, when the current of the battery 108 is greater than a predetermined current value, the control unit 1011 switches to the second supply mode. In yet another example, when the internal resistance of the battery 108 is greater than a predetermined resistance value, the control unit 1011 switches to the second supply mode. As a result, the output current of the image capturing main power source unit 201 can be limited so as not to exceed the allowable current of the battery 108, and the image sensor 102 can be operated along with the power from the power storage device unit 202.

A configuration in which the impedance of the main power source path is changed in accordance with the temperature or the ESR of the power storage device unit 202 has been described thus far with reference to FIGS. 4A and 4B. This makes it possible to supply the necessary power to the image sensor 102 from the power storage device unit 202. However, when the power storage device unit 202 is in an excessively low-temperature state, even if the impedance of the main power source path is set to a maximum, the impedance of the power storage device path will increase therebeyond. Accordingly, power is supplied preferentially from the image capturing main power source unit 201 to the image sensor 102. At this time, there is a risk that the allowable power of the battery 108 or the USB power supply unit 110 will be exceeded, resulting in a system failure in the image capturing apparatus 100.

To solve this problem, the control unit 1011 predicts the power supplied from the image capturing main power source unit 201 to the image sensor 102 based on the information from the temperature sensors 105, and performs control to prohibit shooting operations in the image capturing apparatus 100 when the power exceeds a predetermined value.

Meanwhile, if the impedance of each path serving as a power source path for the image sensor 102 increases excessively, a voltage drop caused by the impedance may cause the supply voltage to drop below the operating voltage of the image sensor 102.

To solve this problem, the control unit 1011 predicts the drop in the voltage of the power source of the image sensor 102 based on the information from the temperature sensor 105, and performs control for prohibiting shooting operations in the image capturing apparatus 100 when the drop in the voltage exceeds a predetermined value.

Although the foregoing example describes a configuration in which the control unit 1011 prohibits shooting operations in the image capturing apparatus 100 based on the information from the temperature sensor 105, the control unit 1011 may prohibit the shooting operations having predicted the ESR of the power storage device unit 202. In this case, the control unit 1011 predicts the power supplied from the image capturing main power source unit 201 to the image sensor 102 based on the ESR of the power storage device unit 202, and performs control to prohibit shooting operations in the image capturing apparatus 100 when that power exceeds a predetermined power value. Additionally, the control unit 1011 predicts a drop in the voltage of the power source of the image sensor 102 based on the ESR of the power storage device unit 202, and performs control to prohibit shooting operations in the image capturing apparatus 100 when the drop in the voltage exceeds a predetermined value.

For example, consider a case where the still image mode has a higher maximum power than the moving image mode, and power from the power storage device unit 202 is assumed to be supplied to the image sensor 102 in the still image mode. In this case, when the power storage device unit 202 has fallen into the state described above, the control unit 1011 prohibits shooting operations only in the still image mode. Alternatively, the control unit 1011 may prohibit shooting operations in the high-speed continuous shooting mode, the high-speed readout mode, and the global shutter mode assuming that more power is supplied from the power storage device unit 202 to the image sensor 102 in those still image modes.

Figure 5A:
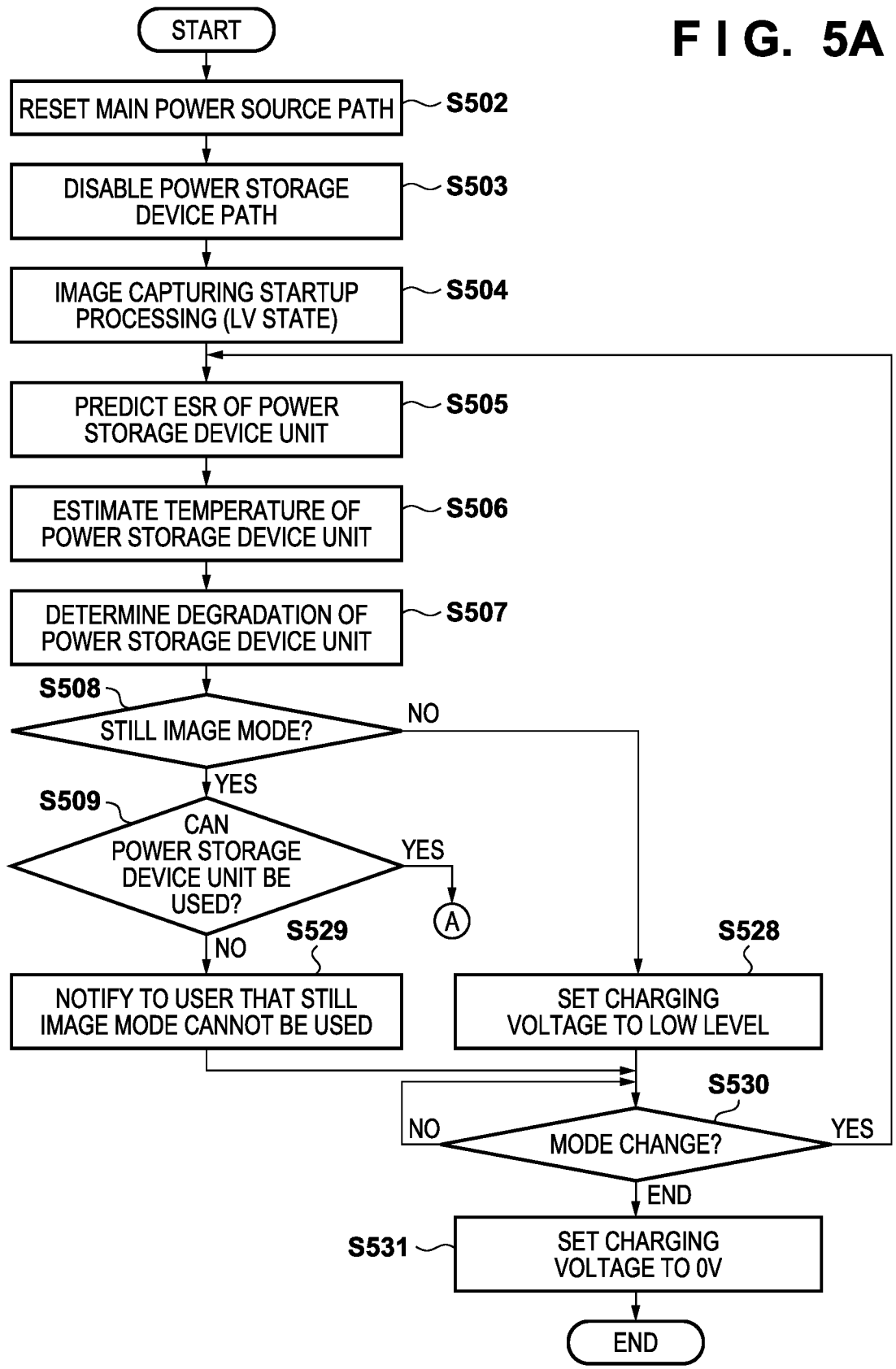
FIG. 5A is a flowchart illustrating processing executed by the image capturing apparatus 100.
Figure 5B:
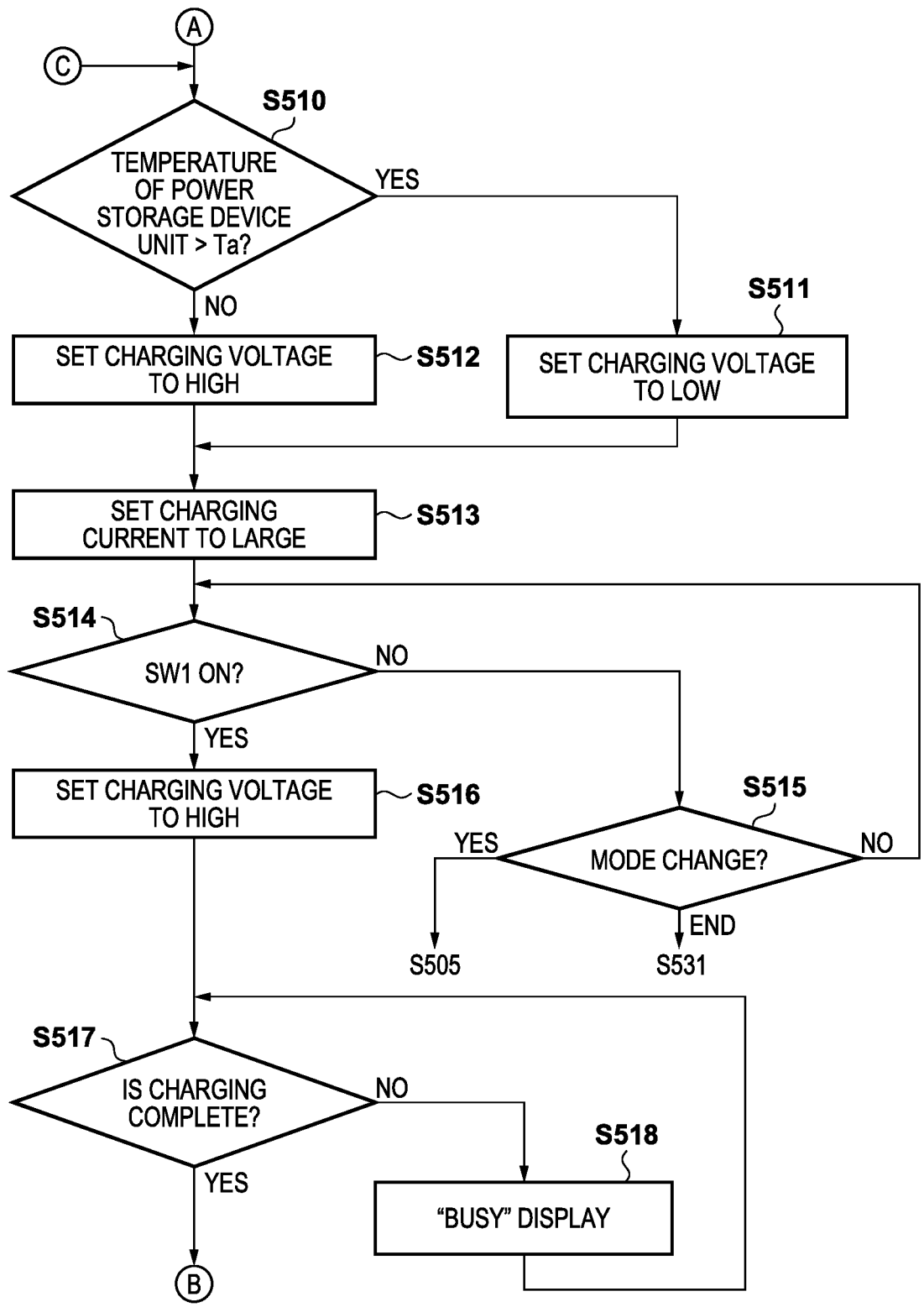
FIG. 5B is a flowchart illustrating processing executed by the image capturing apparatus 100.
Figure 5C:
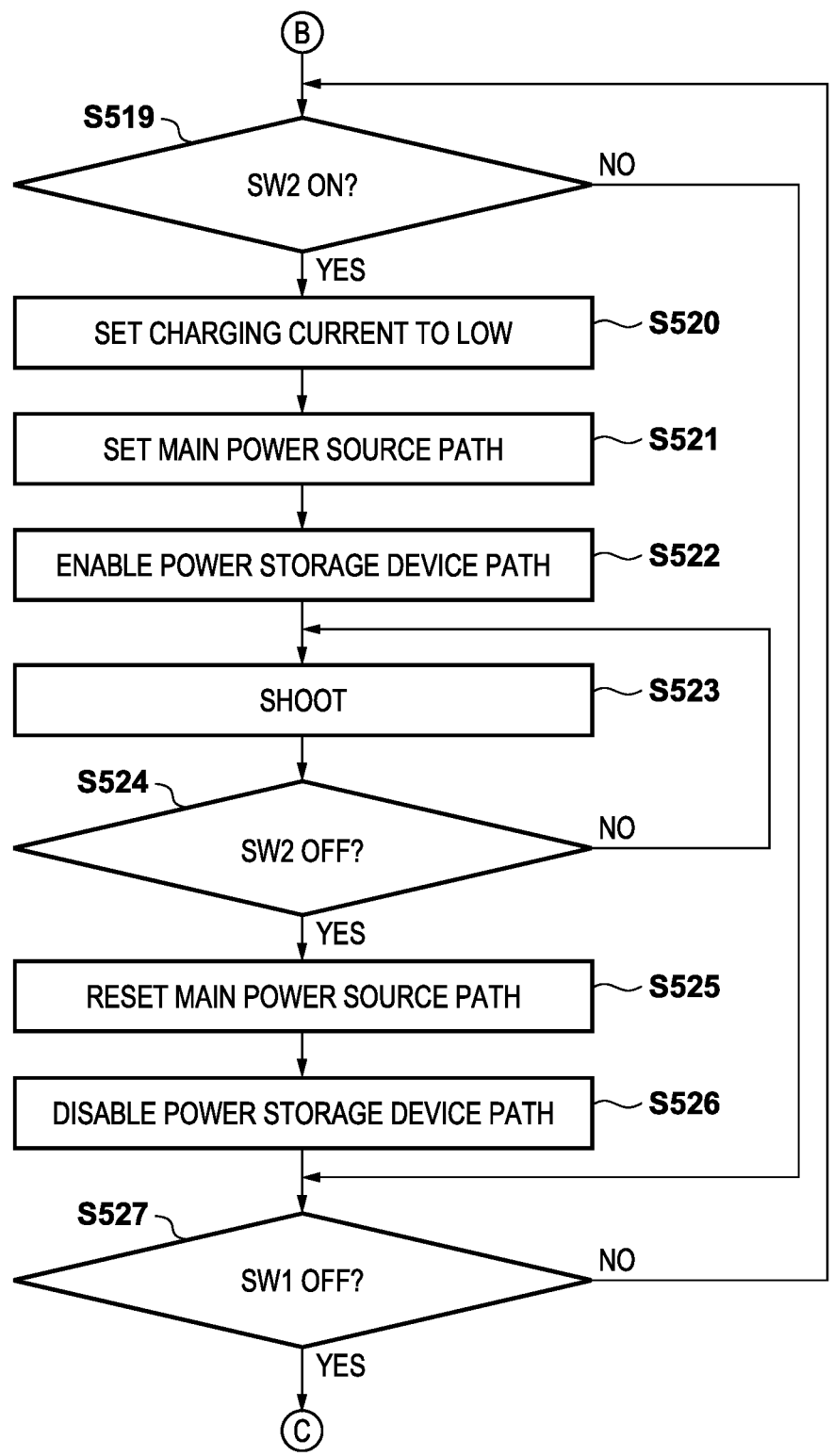
FIG. 5C is a flowchart illustrating processing executed by the image capturing apparatus 100.

FIGS. 5A to 5C are flowcharts illustrating processing executed by the image capturing apparatus 100. Unless otherwise specified, the processing of each step of this flowchart is realized by the control unit 1011 executing a control program stored in the ROM (not shown) of the image capturing apparatus 100. Additionally, the power source unit 107 is controlled by the control unit 1011 via the power source control unit 106. The processing illustrated in this flowchart starts when the user presses a power button of the image capturing apparatus 100 and the image capturing apparatus 100 turns on.

In step S502, the control unit 1011 resets the main power source path. Specifically, the control unit 1011 controls the switch of the main power source path switching unit 401 such that the main power source path is the pass-through path. This makes it possible to prevent unnecessary loss from the resistors 402 in the live view state.

In step S503, the control unit 1011 disables the power storage device path. Specifically, the control unit 1011 controls the power storage device path switching unit 403 to turn the switch off such that power is not supplied from the power storage device unit 202 to the image sensor 102. This prevents loss due to the unnecessary charging/discharging of the power storage device unit 202 during the live view state.

In step S504, the control unit 1011 performs image capturing startup processing, and starts operations of the image capturing apparatus 100 in the live view state (LV state). In this live view state, power is supplied from the image capturing main power source unit 201 to the image sensor 102 via the pass-through path.

In step S505, the control unit 1011 predicts the ESR of the power storage device unit 202. Specifically, first, the control unit 1011 controls the main power source path to be the path B. Additionally, the control unit 1011 turns the switch of the power storage device path switching unit 403 on so as to enable the power storage device path. In addition, the control unit 1011 controls the power storage device charging/discharging unit 204 to charge the power storage device unit 202 such that the voltage of the power storage device unit 202 exceeds the output voltage of the image capturing main power source unit 201. The control unit 1011 then causes the image sensor 102 to perform operations in which the consumed current is known and is constant. At this time, the main power source current detection unit 404 detects current flowing in the main power source path from a difference between the voltage of one end of the resistor 402a and the voltage of another end of the resistor 402a. The detected main power source path current is transmitted to the control unit 1011. The control unit 1011 calculates the current in the power storage device path according to Equation (1).

power storage device path current=image sensor current consumption−main power source path current (1)

Next, the control unit 1011 uses the ratio of the power storage device path current to the main power source path current to predict the ESR of the power storage device unit 202 according to Equation (2).

power storage device unit ESR=resistance value of resistor 402a×(main power source path current/power storage device path current) (2)

In this manner, the ESR of the power storage device unit 202 can be predicted by detecting the current of the main power source path. Although the current consumption of the image sensor 102 is described here as being used to predict the ESR of the power storage device unit 202, another current consumption may be used instead. For example, a dedicated circuit that generates a load consuming a current which is known to the control unit 1011 may be provided separately from the image sensor 102. A method based on detecting the current in the main power source path has been described here as the method for predicting the ESR of the power storage device unit 202. However, the method for predicting the ESR of the power storage device unit 202 is not limited to the method described here and the foregoing calculation equations, and the ESR of the power storage device unit 202 may be predicted using another method, calculation equations, or the like.

Once the prediction of the ESR of the power storage device unit 202 is complete, the control unit 1011 controls the switch such that the main power source path becomes the pass-through path and the power storage device path is disabled.

In step S506, the control unit 1011 estimates the temperature of the power storage device unit 202 based on the data output from the temperature sensors 105.

In step S507, the control unit 1011 determines the degradation of the power storage device unit 202. The determination of the degradation of the power storage device unit 202 will be described with reference to FIGS. 8A to 9.

FIG. 8A is a diagram illustrating temperature characteristics of the power storage device unit 202. The power storage device unit 202 has a characteristic in which the ESR increases as the temperature drops. FIGS. 8B and 8C illustrate the degradation characteristics of the power storage device unit 202. Even at the same applied voltage, degradation will progress more quickly as the temperature rises, and the ESR increases as a result of the degradation. Meanwhile, even at the same temperature, degradation will progress more quickly as the applied voltage increases, and the ESR increases as a result of the degradation. Accordingly, simply specifying the ESR will not indicate whether the specified ESR is due to the temperature characteristics of the power storage device unit 202 or the result of the progress of degradation.

Figure 9:
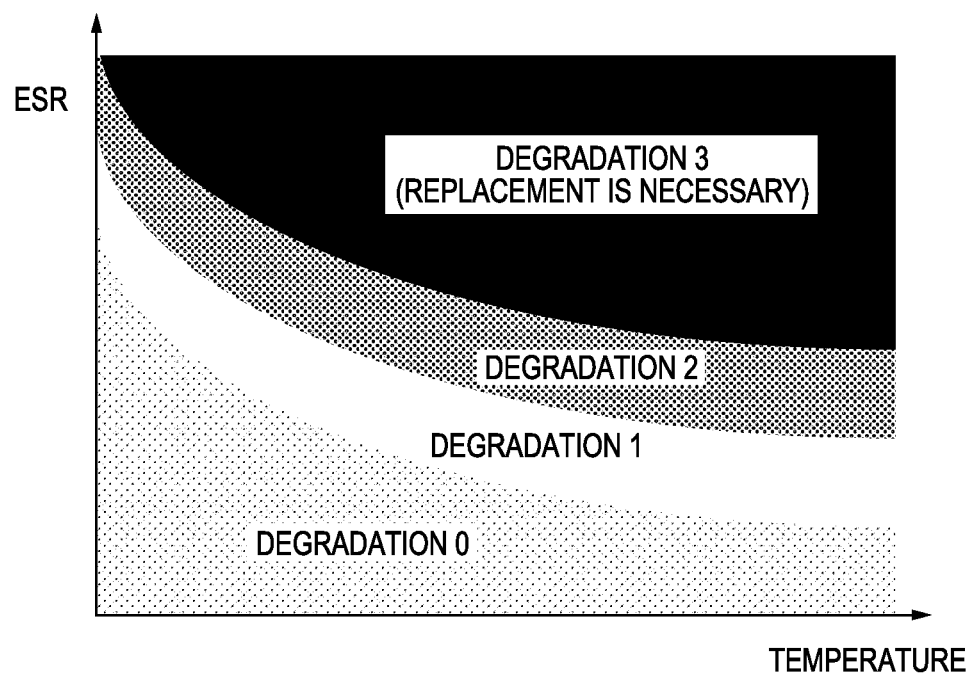
FIG. 9 is a diagram illustrating a region for each of degrees of degradation of the power storage device unit 202.

FIG. 9 is a diagram illustrating a region for each of degrees of degradation of the power storage device unit 202. The control unit 1011 determines the degradation of the power storage device unit 202 based on the regions illustrated in FIG. 9. The ESR of the power storage device unit 202 tends to be low when the temperature is high, but the ESR being high regardless is due to the degradation progressing. Additionally, when the temperature is low, the ESR of the power storage device unit 202 tends to be high, and thus even if the ESR is somewhat high, this can be determined to be due to the temperature characteristics. Using the ESR and temperature information obtained in steps S504 and S505, the control unit 1011 identifies the region of FIG. 9 in which the ESR-temperature relationship is located, and determines the degree of degradation based thereon.

As another example, the control unit 1011 may determine the degree of degradation using ESR degradation thresholds set for each temperature. In this case, the control unit 1011 can determine the degree of degradation by comparing the obtained ESR with the ESR degradation threshold corresponding to the obtained temperature.

In step S508, the control unit 1011 determines whether the operation mode of the image capturing apparatus 100 is the still image mode. The sequence moves to step S509 when the operation mode is the still image mode. If the operation mode is not the still image mode (i.e., if the operation mode is the moving image mode), the sequence moves to step S528.

Note that the still image mode in the determination of S508 is an example of an operation mode in which the current required in the image capture apparatus 100 is likely to exceed the allowable output current of the battery 108 or the USB power supply unit 110. Additionally, the moving image mode in the determination of S508 is an example of an operation mode in which the current required in the image capture apparatus 100 is likely to exceed the allowable output current of the battery 108 or the USB power supply unit 110. Accordingly, a configuration may be employed in which the sequence moves to step S528 instead of step S509 when, for example, the still image mode is a mode in which the power consumption is relatively low (e.g., the low-speed continuous shooting mode or the low-speed readout mode).

In step S509, the control unit 1011 determines whether the power storage device unit 202 can be used in accordance with the degree of degradation of the power storage device unit 202 determined in step S507. When the degree of degradation of the power storage device unit 202 is high (e.g., in the case of "degradation 3" in FIG. 9), the control unit 1011 determines that the power storage device unit 202 cannot be used. When the degree of degradation of the power storage device unit 202 is high, it is predicted that the power necessary for the image sensor 102 will not be supplied and the image capturing apparatus 100 will not be able to operate normally even if the control unit 1011 controls the main power source path switching unit 401 such that the impedance of the main power source path is maximum. For example, in this situation, it is predicted that the power consumption of the image capture apparatus 100 will exceed the allowable power of the battery 108 or the USB power supply unit 110 and a system failure will occur, due to a large amount of power being supplied from the image capturing main power source unit 201 to the image sensor 102. In another case, the impedance of each path which serves as the power source path of the image sensor 102 is high, and thus it is predicted that the voltage supplied to the image sensor 102 will fall below the operating voltage of the image sensor 102 as a result of the voltage drop caused by that impedance. When the degree of degradation is such that the system will actually fall into such a predicted state, the control unit 1011 determines that the power storage device unit 202 cannot be used. If the power storage device unit 202 can be used, the sequence moves to step S510, whereas if the power storage device unit 202 cannot be used, the sequence moves to step S529.

In step S510, the control unit 1011 determines whether the temperature of the power storage device unit 202 is higher than a threshold Ta. The control unit 1011 uses the temperature estimated in step S506 as the temperature of the power storage device unit 202. If the temperature of the power storage device unit 202 exceeds the threshold Ta, there is a high risk that the degradation of the power storage device unit 202 will progress. When the estimated temperature of the power storage device unit 202 is no greater than the threshold Ta, there is a relatively low risk of the degradation of the power storage device unit 202 progressing, even if a high voltage is applied to the power storage device unit 202. In this case, the sequence moves to step S512. If the estimated temperature of the power storage device unit 202 is higher than the threshold Ta, there is a high risk that the degradation of the power storage device unit 202 will progress if a high voltage continues to be applied to the power storage device unit 202. In this case, the sequence moves to step S511.

In step S511, the control unit 1011 controls the power storage device charging/discharging unit 204 and sets the charging voltage of the power storage device unit 202. When the power storage device charging/discharging unit 204 charges the power storage device unit 202 through constant current charging, the control unit 1011 sets the charging voltage to a low level. This is because the temperature of the power storage device unit 202 is high and there is a high risk that the degradation of the power storage device unit 202 will progress. In this manner, the degradation of the power storage device unit 202 can be suppressed by lowering the charging voltage of the power storage device unit 202 based on the information from the temperature sensors 105.

As in step S511, in step S512, the control unit 1011 controls the power storage device charging/discharging unit 204 and sets the charging voltage of the power storage device unit 202. In the case of step S512, the temperature of the power storage device unit 202 is low, and the risk of the degradation of the power storage device unit 202 progressing is also low, and the control unit 1011 therefore sets the charging voltage to a high level. When the operation mode of the image capturing apparatus 100 is an operation mode which assumes that power is supplied from the power storage device unit 202 to the image sensor 102, it is necessary for at least the voltage of the power storage device unit 202 to reach a voltage greater than the output voltage of the image capturing main power source unit 201 during shooting. Accordingly, in a state where the temperature is low and degradation is a concern, keeping the charging voltage of the power storage device unit 202 high makes it possible to smoothly transition to shooting operations without requiring unnecessary charging time during shooting.

In step S513, the control unit 1011 controls the power storage device charging/discharging unit 204 and sets the charging current of the power storage device unit 202. When the power storage device charging/discharging unit 204 charges the power storage device unit 202 through constant current charging, the control unit 1011 sets the output current of the power storage device charging/discharging unit 204. The power storage device charging/discharging unit 204 has a high-output mode, where the output current is relatively high, and a low-output mode, where the output current is relatively low. In step S513, the control unit 1011 sets the power storage device charging/discharging unit 204 to the high-output mode. This makes it possible to rapidly charge the power storage device unit 202 to a target charging voltage. At this timing, from when the operation mode is set to the still image mode to when shooting starts, the current consumption of the image capturing apparatus 100 is relatively low, and there is leeway in terms of the power supplied by the battery 108 or the USB power supply unit 110. Accordingly, setting the power storage device charging/discharging unit 204 to the high-output mode at this timing will pose no problems.

In step S514, the control unit 1011 determines whether the release button (not shown) has been operated by the user, and whether SW1 has turned on. SW1 corresponds to an operation one previous to the release operation made by the user (a shooting preparation instruction), e.g., an operation of pressing the release button halfway. When SW1 is on, the image capturing apparatus 100 is in a shooting preparation state which can transition to shooting operations immediately upon SW2 turning on. If SW1 is not on, the sequence moves to step S515. If SW1 has turned on, the sequence moves to step S516.

In step S515, the control unit 1011 determines whether the operation mode of the image capturing apparatus 100 has been changed. If the operation mode has not been changed, the sequence returns to step S514. If the operation mode has been changed, the sequence returns to step S505. The sequence moves to step S531 when the user has made an operation to terminate the image capturing apparatus 100, such as an operation for turning the main power source switch off, for example.

In step S516, the control unit 1011 sets the charging voltage of the power storage device unit 202 to a high level (more specifically, a voltage at which power can be supplied from the power storage device unit 202 to the image sensor 102). When, in step S512, the charging voltage of the power storage device unit 202 is set to the same voltage as the charging voltage of the power storage device unit 202 set in step S516, it is not necessary to set the charging voltage of the power storage device unit 202 again in step S516. When, in step S511, the charging voltage of the power storage device unit 202 is set to a low level from the standpoint of preventing degradation, in S516, the control unit 1011 sets the charging voltage of the power storage device unit 202 to a voltage at which the power can be supplied from the power storage device unit 202 to the image sensor 102. As a result, shooting operations can be made possible while minimizing the time required to increase the voltage and preventing degradation, even in situations where the temperature of the power storage device unit 202 is high.

In step S517, the control unit 1011 determines whether the charging of the power storage device unit 202 is complete. The control unit 1011 can determine whether the charging is complete by comparing the voltage set in step S516 with the present voltage of the power storage device unit 202. Alternatively, the control unit 1011 may monitor the charging current and determine whether the charging of the power storage device unit 202 is complete based on whether the charging current has stopped. The sequence moves to step S518 if the charging of the power storage device unit 202 is not yet complete. The sequence moves to step S519 if the charging of the power storage device unit 202 is complete.

In step S518, the control unit 1011 makes a "busy" display in conjunction with the live view display. Here, the "busy" display is a display indicating that the image capturing apparatus 100 cannot perform shooting operations. The user can know whether shooting is possible by confirming the "busy" display. The sequence returns to step S517 after the "busy" display. The processing of steps S517 and S518 are repeated until the charging of the power storage device unit 202 is complete. When it is determined in step S517 that the charging of the power storage device unit 202 is complete, the control unit 1011 deletes the "busy" display.

In step S519, the control unit 1011 determines whether the user has operated the release button and SW2 has turned on. "SW2" is a release operation made by the user, and corresponds to an operation for fully pressing the release button, for example. The sequence moves to step S527 if SW2 is not on. The sequence moves to step S520 if SW2 is on.

In step S520, the control unit 1011 changes the charging current from the power storage device charging/discharging unit 204 to the power storage device unit 202. When the power storage device charging/discharging unit 204 charges the power storage device unit 202 through constant current charging, the control unit 1011 changes the output current of the power storage device charging/discharging unit 204. In step S520, the control unit 1011 sets the power storage device charging/discharging unit 204 to the low-output mode. This makes it possible to reduce the amount of power taken from the battery 108 or the USB power supply unit 110 during shooting operations. When the operation mode of the image capturing apparatus 100 is a high-speed continuous shooting mode having a short shooting interval, the charging is performed in the low-output mode, at a charging current having a level at which the power storage device unit 202, which has lost power during the shooting, is recharged within the time leading up to the next instance of shooting operations.

In step S521, the control unit 1011 sets the main power source path to other path than the pass-through path. The control unit 1011 selects the path to be set in accordance with the data output from the temperature sensor 105. The lower the temperature of the power storage device unit 202 is, the higher the ESR of the power storage device unit 202 will be. Accordingly, the control unit 1011 performs control such that the higher the temperature is, the more the impedance of the main power source path increases. This makes it possible to supply power from the power storage device unit 202 to the image sensor 102 regardless of the temperature of the image capturing apparatus 100. Meanwhile, the ESR also rises due to degradation of the power storage device unit 202. Accordingly, the control unit 1011 may select the path to be set by also referring to the ESR of the power storage device unit 202 predicted in step S505. In an ESR where the degree of degradation is within an allowable range, power can be supplied from the power storage device unit 202 to the image sensor 102 regardless of the value of the ESR.

In step S522, the control unit 1011 enables the power storage device path. The control unit controls the power storage device path switching unit 403 to turn on the switch such that power is supplied from the power storage device unit 202 to the image sensor 102. This makes it possible to supply power from the power storage device unit 202 to the image sensor 102 during shooting operations.

In step S523, the control unit 1011 performs shooting operations. At first, the voltage of the power storage device unit 202 is higher than the voltage of the image capturing main power source unit 201, and thus power is supplied from the power storage device unit 202 to the image sensor 102. When the voltage of the power storage device unit 202 drops to the same voltage as the voltage of the image capturing main power source unit 201, more power is supplied to the image sensor 102 from the path, among the main power source path and the power storage device path, which has the lower impedance. In step S521, the impedance of the power storage device path is controlled to be lower than that of the main power source path, and thus power is preferentially supplied from the power storage device unit 202 to the image sensor 102 even if the voltage of the power storage device unit 202 drops. As a result, the instantaneous power taken from the battery 108 or the USB power supply unit 110 can be reduced even when the image capturing apparatus 100 is shooting in an operation mode having a high maximum power, such as the global shutter mode.

In step S524, the control unit 1011 determines whether SW2 has turned off. If SW2 remains on, the sequence returns to S523, and the control unit 1011 performs the next instance of the shooting operation. If SW2 has turned off, the shooting operations stop, and the sequence moves to S525.

In step S525, the control unit 1011 performs reset processing on the main power source path switching unit 401 in the same manner as in step S502.

In step S526, the control unit 1011 disables the power storage device path, in the same manner as in step S503.

In step S527, the control unit 1011 determines whether SW1 has turned off. If SW1 remains on, the sequence returns to step S519, where the control unit 1011 determines whether SW2 has been turned on again. If SW1 is off and SW2 is off, the shooting preparation state ends, and the sequence returns to S510.

In step S528, the control unit 1011 sets the charging voltage of the power storage device unit 202 to a low level. For example, when the operation mode is a mode in which the maximum power of the image sensor 102 is sufficiently covered by the power supplied from the battery 108 or the USB power supply unit 110, such as the moving image mode, the control unit 1011 sets the charging voltage of the power storage device unit 202 to a low level, even during shooting operations. This makes it possible to prevent the power storage device unit 202 from degrading. In particular, when the operation mode of the image capturing apparatus 100 is the moving image mode, there are many use cases where shooting continues for a long period of time, which causes the internal temperature of the image capturing apparatus 100 to rise and causes the temperature of the power storage device unit 202 to rise as well. In an operation mode in which the temperature of the power storage device unit 202 is likely to rise, it is important to set the charging voltage of the power storage device unit 202 to a low level in order to prevent degradation. Furthermore, even if the charging voltage of the power storage device unit 202 is set to a low level here, when the operation mode is switched to the still image mode later, the charging current is increased in step S513 and the power storage device unit 202 is charged rapidly, which makes it possible to quickly transition to the shooting operations.

In step S529, the control unit 1011 displays, in the display unit 103, an indication that the present operation mode (i.e., the still image mode) cannot be used due to degradation of the power storage device unit 202. The user can therefore know not only that the still image mode cannot be used, but also that the power storage device unit 202 has degraded. For example, when a user who has viewed this display wishes to continue using the still image mode in the future, the user can take countermeasures such as replacing the power storage device unit 202. Additionally, in step S529, the control unit 1011 may execute a display that guides the user to other mode that can be used, and thus the user can continue shooting using the other mode.

In step S530, the control unit 1011 determines whether the operation mode of the image capturing apparatus 100 has been changed, in the same manner as in step S515. If the operation mode has not been changed, the control unit 1011 repeats the determination of step S530 and waits for the mode to change, while continuing the live view state. If the operation mode has been changed, the sequence returns to step S505. The sequence moves to step S531 when the user has made an operation to terminate the image capturing apparatus 100, such as an operation for turning the main power source switch off, for example.

In step S531, the control unit 1011 sets the charging voltage of the power storage device unit 202 to 0 V. This makes it possible to suppress degradation of the power storage device unit 202 when the power of the image capturing apparatus 100 is turned off. The control unit 1011 then performs processing for terminating the image capturing apparatus 100, and ends the processing illustrated in this flowchart. In the processing for terminating the image capturing apparatus 100, operations for powering off the power source unit 107 are performed in addition to processing for terminating the respective devices.

Incidentally, the target charging voltage may become lower than the present voltage of the power storage device unit 202 as a result of the charging voltage being set to a low level in steps S511, S528, and S531. In this case, the control unit 1011 may stop the output of the power storage device charging/discharging unit 204 and wait for the power storage device unit 202 to reach the target voltage through natural discharge. In this case, the power accumulated once in the power storage device unit 202 is disabled less frequently, which is advantageous in terms of the battery 108 holding a charge. On the other hand, a voltage higher than the target will be applied for a longer period of time, and there is thus a concern that the degradation of the power storage device unit 202 will progress. To this end, the power storage device charging/discharging unit 204 may be provided with a discharge function, and the discharge may be performed until the target voltage is reached. In this case, the voltage of the power storage device unit 202 drops rapidly, which makes it possible to suppress degradation of the power storage device unit 202.

An example of switch settings in the main power source path switching unit 401 will be described next with reference to FIGS. 6A and 6B. Here, it is assumed that the maximum power consumption of the image capturing apparatus 100 is relatively high in the still image mode, and that the image sensor 102 operates by being supplied with power from the power storage device unit 202. On the other hand, it is assumed that the maximum power consumption of the image capturing apparatus 100 is relatively low in the moving image mode, and that the image sensor 102 operates without being supplied with power from the power storage device unit 202. It is assumed that, among the still image modes, the maximum power consumption of the image capturing apparatus 100 is even higher in the global shutter mode, and that the image capturing apparatus 100 operates by being supplied with more power from the power storage device unit 202.

FIG. 6A is a diagram illustrating switch settings of the main power source path switching unit 401 when switching the main power source path in accordance with the temperature.

When the temperature is 20° C. or higher, path B and path C are turned on in the global shutter mode. At this time, the impedance of the main power source path corresponds to a combined resistance from the resistor 402b and the resistor 402c being disposed in parallel. Meanwhile, in a still image mode other than the global shutter mode, path A and path C are turned on. At this time, the impedance of the main power source path corresponds to a combined resistance from the resistor 402a and the resistor 402c being disposed in parallel. Then, the pass-through path is set in the live view state, even if the mode is the moving image mode or the still image mode. In this manner, for operation modes which supply more power from the power storage device unit 202 to the image sensor 102, the current limitation on the main power source path is increased. Conversely, in an operation mode where not much power needs to be supplied from the power storage device unit 202, loss in the main power source path can be reduced by relaxing the limitation on the main power source path such that no more power than is necessary is supplied from the power storage device unit 202. This also makes it possible to reduce loss due to the charging/discharging of the power storage device unit 202.

When the temperature is less than 20° C. but greater than or equal to 0° C., the switch state is switched so as to increase the impedance of the main power source path in each mode. This is because the ESR of the power storage device unit 202 rises when in a low-temperature state, and increasing the impedance of the main power source path makes it possible to supply power from the power storage device unit 202 to the image sensor 102. Conversely, when the temperature is sufficiently high, relaxing the limitation on the main power source path makes it possible to reduce loss in the main power source path and loss caused by the charging/discharging of the power storage device unit 202. In addition, even in the moving image mode or the still image mode, it is assumed that the power from the power storage device unit 202 is not supplied to the image sensor 102 in the live view state, and is therefore fixed by the pass-through path regardless of the temperature.

Likewise, when the temperature is less than 0° C., the switch state is switched so as to further increase the impedance of the main power source path in each mode.

FIG. 6B is a diagram illustrating switch settings of the main power source path switching unit 401 when switching the main power source path in accordance with the ESR of the power storage device unit 202.

When the ESR of the power storage device unit 202 is to be estimated, the path B is turned on, regardless of the operation mode of the image capturing apparatus 100, other settings, and the like. The control unit 1011 can predict the ESR of the power storage device unit 202 based on the known resistance value of the resistor 402b, the known operating power of the image sensor 102 and the information from the main power source current detection unit 404 when the image sensor 102 is operated. During shooting, the control unit 1011 switches the switch state of the main power source path switching unit 401 in accordance with the predicted ESR.

When the ESR of the power storage device unit 202 is less than 100 mΩ, the path B and the path C are turned on in the global shutter mode. At this time, the impedance of the main power source path corresponds to a combined resistance from the resistor 402b and the resistor 402c being disposed in parallel. Meanwhile, in a still image mode other than the global shutter mode, path A and path C are turned on. At this time, the impedance of the main power source path corresponds to a combined resistance from the resistor 402a and the resistor 402c being disposed in parallel. Then, the pass-through path is set in the live view state, even if the mode is the moving image mode or the still image mode. In this manner, for operation modes which supply more power from the power storage device unit 202 to the image sensor 102, the current limitation on the main power source path is increased. Conversely, in an operation mode where not much power needs to be supplied from the power storage device unit 202, loss in the main power source path can be reduced by relaxing the limitation on the main power source path such that no more power than is necessary is supplied from the power storage device unit 202. This also makes it possible to reduce loss due to the charging/discharging of the power storage device unit 202.

When the ESR of the power storage device unit 202 is greater than or equal to 100 mΩ but less than 400 mΩ, the switch state is switched so as to increase the impedance of the main power source path in each mode. The ESR of the power storage device unit 202 is rising, and thus increasing the impedance of the main power source path makes it possible to supply power from the power storage device unit 202 to the image sensor 102. Conversely, when the ESR of the power storage device unit 202 is sufficiently low, relaxing the limitation on the main power source path makes it possible to reduce loss in the main power source path and loss caused by the charging/discharging of the power storage device unit 202. In addition, even in the moving image mode or the still image mode, it is assumed that the power from the power storage device unit 202 is not supplied to the image sensor 102 in the live view state, and is therefore fixed by the pass-through path regardless of the ESR of the power storage device unit 202.

Likewise, when the ESR of the power storage device unit 202 is greater than or equal to 400 mΩ but less than 600 mΩ, the switch state is switched so as to further increase the impedance of the main power source path in each mode.

When the ESR of the power storage device unit 202 reaches at least 600 mΩ, shooting in the global shutter mode is prohibited. This is because it is predicted that the system will fall into a state of failure even if only the path C is turned on such that the impedance of the main power source path is maximum. For example, it is predicted that the power consumption of the image capture apparatus 100 will exceed the allowable power output from the battery 108 or the USB power supply unit 110, and a system failure will occur, due to a large amount of power being supplied from the image capturing main power source unit 201 to the image sensor 102. Meanwhile, in another case, the impedance of each path that can serve as a power source path of the image sensor 102 is high, and thus it is predicted that the voltage supplied to the image sensor 102 drops below the operating voltage of the image sensor 102 due to the drop in voltage caused by the impedance. It is possible to prohibit shooting operations in accordance with the ESR before such a predicted situation actually occurs.

The settings of the power storage device charging/discharging unit 204 in the respective operation modes will be described next with reference to FIG. 6C.

If shooting is underway in the global shutter mode, the charging voltage of the power storage device unit 202 is set to 5.0 V. For example, if the output voltage of the image capturing main power source unit 201 is 4.5 V, the voltage of the power storage device path is higher than that of the main power source path, and thus power is preferentially supplied from the power storage device unit 202 to the image sensor 102. When the estimated temperature of the power storage device unit 202 is higher than Ta in the live view state, the charging voltage is lowered to 2.0 V. This makes it possible to suppress degradation of the power storage device unit 202. Here, if the charging voltage is set to 0 V, and the user has performed an operation to start shooting operations in this state, it will take a long time to charge from 0 V to 5.0 V, which in turn will lengthen the time for which the user cannot take a shot. In order to solve this problem, charging is performed within a range where the degradation will not progress significantly, even if the temperature is higher than Ta. Furthermore, the voltage is lowered to approximately 4.5 V for the purpose of preventing degradation even when the estimated temperature of the power storage device unit 202 is no greater than Ta. It takes little time to charge from 4.5 V to 5.0 V, which reduces the impact on the user.

If shooting is underway in a still image mode other than the global shutter mode, the charging voltage of the power storage device unit 202 is set to 4.5 V. In a still image mode other than the global shutter mode, the power supplied from the power storage device unit 202 to the image sensor 102 may be lower than in the global shutter mode, and thus the charging voltage of the power storage device unit 202 is lowered from that used in the global shutter mode. Setting the charging voltage for the power storage device unit 202 to an optimal voltage according to the operation mode in this manner is important in terms of suppressing degradation of the power storage device unit 202. When the estimated temperature of the power storage device unit 202 is higher than Ta in the live view state, the charging voltage is lowered to 2.0 V, in the same manner as when using the global shutter mode.

In the moving image mode, the charging voltage of the power storage device unit 202 is set to a uniform 2.0 V regardless of whether shooting operations are underway or the live view state is active. In such a mode, where it is assumed that the image sensor 102 will be operated without supplying power from the power storage device unit 202, degradation of the power storage device unit 202 can be suppressed by reducing the charging voltage of the power storage device unit 202. Here, the reason the charging voltage of the power storage device unit 202 is not set to 0 V is to shorten the charging time of the power storage device unit 202 even slightly when the user switches to the still image mode and attempts to start shooting operations immediately.

Additionally, when measuring the ESR, the charging voltage of the power storage device unit 202 is set to 4.5 V. Here, 4.5 V is a voltage setting which means approximately the same as the output voltage of the image capturing main power source unit 201, and doing so makes it possible to calculate the impedance ratio of each path from the current ratio of each path.

Additionally, the state is highly likely to continue for a long period of time when the power of the image capturing apparatus 100 is turned off, and thus the charging voltage of the power storage device unit 202 is set to 0.0 V. This makes it possible to suppress degradation of the power storage device unit 202 while the power of the image capturing apparatus 100 is off.

For example, when the operation mode is switched from the moving image mode to the global shutter mode, the charging voltage is changed from 2.0 V to 5.0 V. At this time, if the charging current is low, it will take a longer period of time from when the user changes the mode to when the user can take a shot. Accordingly, the power storage device charging/discharging unit 204 is put into the high-output mode and the power storage device unit 202 is charged at a charging current of 300 mA during the live view state from when the operation mode is transitioned to when shooting starts. However, if shooting is started while still in the high-output mode, the power taken from the battery 108 or the USB power supply unit 110 will increase due to the charging current of the power storage device unit 202. Accordingly, before the start of shooting, the power storage device charging/discharging unit 204 is put into the low-output mode, and the power storage device unit 202 is charged at a charging current of 100 mA. The switch from the high-output mode to the low-output mode may be executed prior to the start of shooting, and for example, the mode may be switched to the low-output mode at a stage where charging is complete, determined using a method such as voltage monitoring or the like. In another example, the mode may be switched to the low-output mode upon a predetermined length of time, according to the difference in the charging voltage of the power storage device unit 202, elapsing after the operation mode and the charging voltage of the power storage device unit 202 have been changed.

An example of the operations of the image capturing apparatus 100 will be described next with reference to the timing charts in FIGS. 7-1 and 7-2. The timing chart illustrates an example of the operations, and the image capturing apparatus 100 operates in an appropriate state in response to user operations.

In FIGS. 7-1 and 7-2, in order from the top, user operations performed to operate the image capturing apparatus 100 are indicated by 7A, and operations by the image capturing apparatus 100 in response to the user operations in 7A are indicated by 7B.

7C indicates a current amount (consumed current) when the image sensor 102 operates. 7D indicates changes in the temperature of the power storage device unit 202 calculated by the temperature sensors 105. 7E indicates settings of the main power source path switching unit 401 (settings as to whether to prioritize the power supply for the image capturing main power source unit 201 or the power storage device unit 202). When the level in 7E is low (pass-through), power is supplied preferentially from the image capturing main power source unit 201 to the image sensor 102. When the level in 7E is high (resistors on), power is supplied preferentially from the power storage device unit 202 to the image sensor 102.

7F indicates the current amount supplied from the image capturing main power source unit 201. This current amount must not exceed the maximum allowable current output from the battery 108 or the USB power supply unit 110. 7G indicates the current amount supplied from the power storage device unit 202. 7H indicates the charging voltage of the power storage device unit 202. 7I indicates the maximum current amount when charging the power storage device unit 202.

The following will describe the operations by the image capturing apparatus 100 in accordance with operations made in the image capturing apparatus 100 by the user.

At T701, the user starts up the image capturing apparatus 100 by operating a power switch (not shown). First, it is assumed that the image capturing apparatus 100 is set to operate in the global shutter mode. The image capturing apparatus 100 starts initialize operations (see 7B), and the current in the image sensor 102 increases (see 7C). Once the current in the image sensor 102 stabilizes, the main power source path switching unit 401 is switched (see 7E). The degradation of the power storage device unit 202 is determined by operating the image sensor 102 using the power from the power storage device unit 202. The following descriptions will assume that the power storage device unit 202 has not degraded. Once the degradation determination ends, the state transitions to the live view state. In the live view state, the charging voltage of the power storage device unit 202 is set to approximately 4.5 V (see 7H). Approximately 4.5 V is a voltage at which degradation does not progress easily at high temperatures and charging does not take a long time. The following descriptions will assume that the image capturing apparatus 100 is set to the still image mode, and to the global shutter mode as well, as a result of user operations.

At T702, the user operates the release button for the purpose of AF operations, and turns SW1 on. At this time, the image capturing apparatus 100 enters the shooting standby state, and the power storage device unit 202 is charged to a voltage (approximately 5.0 V) at which sufficient power can be supplied to the image sensor 102 (see 7H).

At T703, the image capturing apparatus 100 enters shooting operations in response to the user operating the release button and SW2 turning on. Because this shooting is performed in the global shutter mode, the current consumed by the image sensor 102 increases instantaneously (see 7C). At this time, the maximum charging current of the power storage device unit 202 is reduced (see 7I). Specifically, control is performed to reduce the maximum charging current from 300 mA to approximately 100 mA. Furthermore, the main power source path switching unit 401 is switched (see 7E). Specifically, the state is changed from the pass-through state to a state in which path B is on. Through this, the main power source path is changed to a path that traverses the resistor 402*b* (approximately 200 mΩ). By performing the above-described operations, current can be supplied from the power storage device unit 202 when the image sensor 102 requires a high current instantaneously. Additionally, the operations can be performed without the current from the image capturing main power source unit 201 increasing, so as to stay within the rated current of the battery 108 or the USB power supply unit 110.

At T704, the user stops operating the release button, SW1 and SW2 turn off, and as a result, the shooting operations of the image capturing apparatus 100 end, and the state returns to the live view state. Here, the maximum charging current of the power storage device unit 202 is increased (see 7I). Specifically, control is performed to increase the maximum charging current from 100 mΩ to approximately 300 mA. Furthermore, the main power source path switching unit 401 is switched (see 7E). Specifically, the main power source path is changed from the path traversing the resistor 402*b* (approximately 200 mΩ) to the pass-through path.

At T705, the user makes a mode switch, and changes from the still image mode to the moving image mode. The current consumed by the image sensor 102 in the moving image mode has a higher average current value, but is assumed not to exceed that of the still image mode instantaneously (see 7C). Accordingly, shooting can be performed appropriately without using power from the power storage device unit 202. The charging voltage of the power storage device unit 202 (approximately 2.0 V) is reduced (see 7H), and the maximum charging current of the power storage device unit 202 is also reduced (see 7I). Specifically, control is performed to reduce the maximum charging current from 300 mA to approximately 100 mA.

On the other hand, the average current supplied to the image sensor 102 in the moving image mode is high, which causes the internal temperature of the image capturing apparatus 100 to rise and causes the temperature of the power storage device unit 202 built therein to rise as well. If a moving image continues to be shot for a set period of time, the temperature of the power storage device unit 202 will exceed Ta (see 7D).

At T706, the moving image shooting is ended in response to a user operation, and the image capturing apparatus 100 transitions to the still image mode. At this time, it is assumed that the temperature of the power storage device unit 202 exceeds Ta (see 7D). At this time, the charging voltage of the power storage device unit 202 is kept at a low setting (approximately 2.0 V) in order to prevent the power storage device unit 202 from degrading (see 7H).

At T707, it is assumed that the user operates the release button and turns both SW1 and SW2 on simultaneously. The power storage device unit 202 is charged to a voltage that can sufficiently support the power of the image sensor 102 (approximately 5.0 V) (see 7H). However, because the temperature of the power storage device unit 202 is high, the charging voltage of the power storage device unit 202 drops at the start of the charging, which makes the charging take a longer period of time. During this period, the image capturing apparatus 100 executes the "busy" display to notify the user that the global shutter mode cannot be used. Once the charging of the power storage device unit 202 is complete, the maximum charging current of the power storage device unit 202 is reduced (see 7I). Specifically, control is performed to reduce the maximum charging current from 300 mA to approximately 100 mA. The main power source path switching unit 401 is switched (see 7E). Specifically, the state is changed from the pass-through state to the state in which path B is on. Through this, the main power source path is changed to the path that traverses the resistor 402b (approximately 200 mΩ). By performing the above-described operations, current can be supplied from the power storage device unit 202 when the image sensor 102 requires a high current instantaneously. Additionally, the operations can be performed without the current from the image capturing main power source unit 201 increasing, so as to stay within the rated current of the battery 108 or the USB power supply unit 110.

At T708, the user stops operating the release button, SW1 and SW2 turn off, and as a result, the shooting operations of the image capturing apparatus 100 end, and the state returns to the live view state. The maximum charging current of the power storage device unit 202 is increased (see 7I). Specifically, the maximum charging current is changed from 100 mA to approximately 300 mA. Furthermore, the main power source path switching unit 401 is switched (see 7E). Specifically, the main power source path is changed from the path traversing the resistor 402b (approximately 200 mΩ) to the pass-through path.

From then on, the operations at T709 and T710 are similar to the operations at T703 and T704 as long as the temperature of the power storage device unit 202 drops sufficiently.

Then, if the user has not operated the operation unit (not shown) for a set period of time, the image capturing apparatus 100 enters a power-saving mode at T711. At this time, the image sensor 102 turns the power off, and reduces the voltage of the power storage device unit 202 (see 7H).

At T712, when the user turns the power switch of the image capturing apparatus 100 off, the voltage of the power storage device unit 202 is reduced to 0 V (see 7H).

Examples of various types of notifications made to a user by the image capturing apparatus 100 will be described next with reference to FIG. 10. The control unit 1011 makes the notifications to the user by performing a GUI display in the display unit 103. Here, the global shutter mode is an example of an operation mode of the image capturing apparatus 100 which assumes that power is supplied from the power storage device unit 202 to the image sensor 102.

A display 1001 is an example of a display made when the user has set the global shutter mode, but it is determined that shooting operations cannot be performed in the global shutter mode due to degradation of the power storage device unit 202.

The degree of degradation of the power storage device unit 202 is determined based on the predicted ESR of the power storage device unit 202 and the information from the temperature sensors 105, as described with reference to FIG. 9. The display 1001 makes a notification that the power storage device unit 202 has degraded and that shooting is prohibited in the present operation mode. Additionally, the user is guided to another operation mode (for example, a normal image capturing mode in which the low-speed readout mode of the image sensor 102 is set) as an alternative operation mode, and when a button 1003 is selected, the image capturing apparatus 100 transitions to that alternative operation mode. When a button 1002 is selected, the image capturing apparatus 100 enters a live view state in the present mode. From the display 1001, the user can know that the degradation of the power storage device unit 202 is progressing and that shooting is not possible in the present operation mode. The user can also smoothly switch to another mode for shooting. The display 1001 is displayed in step S529, for example.

A display 1004 is an example of a display made when the user has set the global shutter mode, but it is determined that shooting operations cannot be performed in the global shutter mode due to the temperature of the power storage device unit 202 being extremely low. In the display 1004, the user is notified that the power storage device unit 202 cannot be used due to the low temperature, and therefore understands that shooting in the global shutter mode would be possible if the temperature of the image capturing apparatus 100 rises. Guidance to the alternative operation mode is also provided, in the same manner as with the display 1001, and when a button 1006 is selected, the image capturing apparatus 100 transitions to the alternative operation mode. When a button 1005 is selected, the image capturing apparatus 100 enters a live view state in the present mode. The display 1004 is displayed in step S529, for example.

Like the display 1001, a display 1007 is an example of a display made when the user has set the global shutter mode, but it is determined that shooting operations cannot be performed in the global shutter mode due to degradation of the power storage device unit 202. The display 1007 notifies the user that it is necessary to replace the power storage device unit 202. For example, if the power storage device unit 202 can be manually replaced by the user themselves, this display can provide prompts to perform tasks for replacing the power storage device unit 202. The display 1007 is displayed in step S529, for example.

Like the display 1001 and the display 1007, a display 1008 is an example of a display made when the user has set the global shutter mode, but it is determined that shooting operations cannot be performed in the global shutter mode due to the temperature of the power storage device unit 202 being extremely low. The display 1008 notifies the user that an error has occurred in the image capturing apparatus 100. For example, the user who has confirmed this display can make a request for repair by bringing the image capturing apparatus 100 to a service desk of the manufacturer. Additionally, displaying an error number associated with degradation of the power storage device unit 202 enables the user or a service desk manager to confirm the error number and know that the error is in the power storage device unit 202. The display 1008 is displayed in step S529, for example.

A display 1009 is an example of a live view display in a state where it is determined that shooting operations cannot be performed in the global shutter mode due to degradation of the power storage device unit 202. For example, the display 1009 is displayed when the user selects the button 1002 in the display 1001, when the user selects the button 1005 in the display 1004, or the like. Superimposing an icon indicating a state in which shooting in the global shutter mode is prohibited over the live view makes it easy for the user to understand whether it is possible to shoot at present. If this display is made due to a low temperature, the icon is deleted when the temperature rises and power can again be supplied from the power storage device unit 202 to the image sensor 102. This enables the user to know that shooting is possible once again.

The display 1001, the display 1004, the display 1007, the display 1008, and the display 1009 are all displayed when it is determined that shooting operations cannot be performed in the global shutter mode due to degradation or a low temperature of the power storage device unit 202. These displays are also displayed when the user has set the global shutter mode. As a result, the displays are not made while the user is using the image capturing apparatus 100 in another mode, which enables the user to concentrate more on the shooting even if, for example, the power storage device unit 202 has degraded or is at a low temperature.

A display 1010 is an example of a live view display in a state where shooting cannot be performed until the charging of the power storage device unit 202 is complete. Superimposing an icon indicating that it is necessary to stand by for shooting on the live view display makes it easy for the user to know whether shooting is possible at present. This icon is deleted once the charging is complete. This enables the user to know that shooting is possible once again. The display 1010 is displayed in step S518, for example.

A display 1021 is an example of a settings screen for the image capturing apparatus 100. For example, the display 1021 is displayed in the display unit 103 when the user presses a menu button of the image capturing apparatus 100. An item enabling information on the battery 108 to be confirmed, an item enabling the degree of degradation of the power storage device unit 202 to be confirmed, and the like are displayed in the display 1021, for example. When the user makes an operation for displaying the degree of degradation of the power storage device unit 202 in the display 1021, a display 1022, a display 1023, or the like is displayed in accordance with the degree of degradation of the power storage device unit 202. A display such as the display 1022 is made when the degree of degradation is within a range in which the power storage device unit 202 can be used even in the global shutter mode, for example. An indication of the degree of degradation of the power storage device unit 202 is displayed in the display 1022. The display 1023 is displayed when the degree of degradation is such that the power storage device unit 202 cannot be used in the global shutter mode. The display 1023 provides the user with information indicating the degree of degradation of the power storage device unit 202, as well as a notification that replacement is necessary. The user can be prompted to perform tasks for replacing the power storage device unit 202 through this display.

As described above, according to the first embodiment, the image capturing apparatus 100 charges the power storage device unit 202 using power from the image capturing main power source unit 201. In a first operation state (e.g., an operation state in which a recording image is not being shot), the image capturing apparatus 100 performs control such that power is supplied from the image capturing main power source unit 201 to the image sensor 102 without power being supplied from the power storage device unit 202 to the image sensor 102. In a second operation state (e.g., an operation state in which a recording image is being shot, in step S523) in which the maximum power consumption of the image sensor 102 is higher than in the first operation state, the image capturing apparatus 100 performs control such that power is supplied from the image capturing main power source unit 201 and the power storage device unit 202 to the image sensor 102. This makes it possible to reduce the peak current of the main power supply that supplies power to the image sensor.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-125849, filed Aug. 5, 2022 which is hereby incorporated by reference herein in its entirety.

What is claimed is:
1. An image capturing apparatus comprising:
an image sensor;
a power supply circuit;
a power storage device; and
at least one processor which executes a program stored in a memory and functions as:
  a charging unit configured to charge the power storage device using power from the power supply circuit; and
  a control unit configured to perform control such that in a first operation state of the image capturing apparatus, power is supplied from the power supply circuit to the image sensor without power being supplied from the power storage device to the image sensor, and to perform control such that in a second operation state of the image capturing apparatus in which a maximum power consumption of the image sensor is higher than in the first operation state, power is supplied from the power supply circuit and the power storage device to the image sensor.

2. The image capturing apparatus according to claim 1, wherein the first operation state is an operation state in which the image capturing apparatus is not shooting a recording image in a first operation mode, and
the second operation state is an operation state in which the image capturing apparatus is shooting a recording image in the first operation mode.

3. The image capturing apparatus according to claim 2, wherein the maximum power consumption of the image sensor for the image capturing apparatus to shoot a recording image in the first operation mode is higher than the maximum power consumption of the image sensor for the image capturing apparatus to shoot a recording image in a second operation mode, and
in the second operation mode, the control unit performs control such that power is supplied from the power supply circuit to the image sensor without power being supplied from the power storage device to the image sensor.

4. The image capturing apparatus according to claim 3, wherein the first operation mode is a still image mode, and the second operation mode is a moving image mode.

5. The image capturing apparatus according to claim 2, wherein the control unit:
controls the charging unit to charge the power storage device to a second voltage when a shooting preparation instruction is not being made in the first operation state; and
controls the charging unit to charge the power storage device to a third voltage that is the same as the second voltage or is higher than the second voltage when the shooting preparation instruction is made in the first operation state.

6. The image capturing apparatus according to claim 5, wherein when the shooting preparation instruction is not being made in the first operation state, the control unit:
controls the charging unit to charge the power storage device to the second voltage if a temperature of the power storage device is a first temperature; and
controls the charging unit to charge the power storage device to a first voltage lower than the second voltage if the temperature of the power storage device is a second temperature higher than the first temperature.

7. The image capturing apparatus according to claim 5, wherein the third voltage is higher than the second voltage when the recording image is shot using a global shutter in the second operation state.

8. The image capturing apparatus according to claim 1, wherein the control unit:
controls the charging unit to charge the power storage device with a first current in the first operation state; and
controls the charging unit to charge the power storage device with a second current lower than the first current in the second operation state.

9. The image capturing apparatus according to claim 1, wherein the at least one processor further functions as:
a determination unit configured to determine whether the power storage device can be used, and
wherein when it is determined that the power storage device cannot be used, the control unit performs control such that the image capturing apparatus does not enter the second operation state.

10. The image capturing apparatus according to claim 9, wherein the determination unit determines whether the power storage device can be used based on a temperature and an equivalent series resistance (ESR) of the power storage device.

11. The image capturing apparatus according to claim 1, wherein the power storage device includes an electrical double-layer capacitor (EDLC) or an all-solid-state battery.

12. The image capturing apparatus according to claim 1, wherein the power supply circuit includes a battery,
the battery is a power source for the image capturing apparatus, and
the charging unit charges the power storage device using power from the battery.

13. The image capturing apparatus according to claim 1, wherein
the image sensor is a CMOS type image sensor and has a plurality of read out modes including a global shutter mode and a low-speed read out mode,
the first operation state is an image capture stand-by state and the second operation state is a shooting state in which the image sensor shots an image for recording,
the control unit performs the control in accordance with the read out mode set to the image sensor such that power is supplied from the power supply circuit to the image sensor without power being supplied from the power storage device to the image sensor in the first operation state and power is supplied from the power supply circuit and the power storage device to the image sensor in the second operation state if the image sensor is set to the global shutter mode, and power is supplied from the power supply circuit to the image sensor without power being supplied from the power storage device to the image sensor in both the first operation state and the second operation state if the image sensor is set to the low-speed read out mode.

14. A control method for an image capturing apparatus, the image capturing apparatus comprising:
an image sensor;
a power supply circuit; and
a power storage device, and
the control method comprising:
charging the power storage device using power from the power supply circuit; and
performing control such that in a first operation state of the image capturing apparatus, power is supplied from the power supply circuit to the image sensor without power being supplied from the power storage device to the image sensor, and performing control such that in a second operation state of the image capturing apparatus in which a maximum power consumption of the image sensor is higher than in the first operation state, power is supplied from the power supply circuit and the power storage device to the image sensor.

15. A non-transitory computer-readable storage medium which stores a program for causing a computer of an image capturing apparatus to execute a control method,
the image capturing apparatus comprising:
an image sensor;
a power supply circuit; and
a power storage device, and
the control method comprising:
charging the power storage device using power from the power supply circuit; and
performing control such that in a first operation state of the image capturing apparatus, power is supplied from the power supply circuit to the image sensor without power being supplied from the power storage device to the image sensor, and performing control such that in a second operation state of the image capturing apparatus in which a maximum power consumption of the image sensor is higher than in the first operation state, power is supplied from the power supply circuit and the power storage device to the image sensor.

* * * * *